United States Patent
Yasui

(10) Patent No.: US 12,222,008 B2
(45) Date of Patent: Feb. 11, 2025

(54) JOINING OF FIBER-CONTAINING COMPOSITE MATERIAL

(71) Applicant: NABTESCO CORPORATION, Tokyo (JP)

(72) Inventor: Tsutomu Yasui, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 17 days.

(21) Appl. No.: 18/165,080

(22) Filed: Feb. 6, 2023

(65) Prior Publication Data

US 2023/0182407 A1    Jun. 15, 2023

Related U.S. Application Data

(62) Division of application No. 16/549,300, filed on Aug. 23, 2019, now Pat. No. 11,668,339.

(30) Foreign Application Priority Data

Sep. 7, 2018   (JP) ................................ 2018-167876

(51) Int. Cl.
  *B29C 33/48*    (2006.01)
  *B29C 65/02*    (2006.01)
  (Continued)

(52) U.S. Cl.
  CPC .............. *F16C 7/026* (2013.01); *B29C 65/02* (2013.01); *B29C 70/06* (2013.01); *B29C 70/30* (2013.01);
  (Continued)

(58) Field of Classification Search
  CPC ...... B29C 2043/3649; B29C 66/81459; B29C 66/81455; B29C 33/505; B29C 33/52; B29C 33/54
  See application file for complete search history.

(56) References Cited

U.S. PATENT DOCUMENTS 4,353,268 A    10/1982  Picard
6,110,407 A *   8/2000  Murphy .............. B29C 33/3842
                                                    264/225
(Continued)

FOREIGN PATENT DOCUMENTS

DE    102012018553 A1    3/2014
DE    102014014296 A1    3/2016
(Continued)

OTHER PUBLICATIONS

Machine Translation of DE 102012018553 A1 obtained on Oct. 6, 2022.
(Continued)

*Primary Examiner* — Matthew J Daniels
(74) *Attorney, Agent, or Firm* — Pillsbury Winthrop Shaw Pittman, LLP

(57) ABSTRACT

A joining structure according to one embodiment of the present invention includes a first member and a second member, the first member having a hole extending along an axis direction, the second member including a shaft member, the shaft member being formed of a fiber-containing composite material and having a shape to fit in the hole, the second member being joined to the first member via the shaft member so that movement thereof in the axis direction is restricted.

15 Claims, 20 Drawing Sheets

(51) Int. Cl.

| | |
|---|---|
| *B29C 70/06* | (2006.01) |
| *B29C 70/30* | (2006.01) |
| *B29C 70/44* | (2006.01) |
| *B64C 9/02* | (2006.01) |
| *F16C 7/02* | (2006.01) |
| *F16C 11/04* | (2006.01) |
| *B29L 31/00* | (2006.01) |
| *B29L 31/06* | (2006.01) |

(52) U.S. Cl.
CPC ............... *B64C 9/02* (2013.01); *F16C 11/04* (2013.01); *B29L 2031/06* (2013.01); *B29L 2031/75* (2013.01); *F16C 2326/43* (2013.01); *Y02T 50/40* (2013.01)

(56) References Cited

U.S. PATENT DOCUMENTS

| | | | | |
|---|---|---|---|---|
| 7,543,835 | B2* | 6/2009 | Murphy | B62K 21/04 |
| | | | | 280/275 |
| 9,441,374 | B2 | 9/2016 | Ganis | |
| 9,475,571 | B2 | 10/2016 | Saito | |
| 9,482,266 | B2 | 11/2016 | Dewhirst | |
| 9,568,040 | B2 | 2/2017 | Ganis | |
| 9,726,325 | B2 | 8/2017 | Ganis | |
| 9,874,240 | B2* | 1/2018 | Fiedler | F16C 3/026 |
| 10,493,703 | B2 | 12/2019 | Yasui | |
| 10,654,227 | B2 | 5/2020 | Mihara | |
| 11,067,114 | B2 | 7/2021 | Bernard | |
| 2004/0092329 | A1* | 5/2004 | Meyer | A63B 60/54 |
| | | | | 473/319 |
| 2008/0093771 | A1* | 4/2008 | Agostini | B29C 33/505 |
| | | | | 264/315 |
| 2012/0228467 | A1* | 9/2012 | Wallen | B29C 43/34 |
| | | | | 264/219 |
| 2014/0332626 | A1 | 11/2014 | Saito et al. | |
| 2016/0271888 | A1 | 9/2016 | Mihara et al. | |
| 2017/0130764 | A1 | 5/2017 | Yasui | |
| 2021/0071707 | A1 | 3/2021 | Funck | |
| 2021/0155340 | A1 | 5/2021 | Ito | |

FOREIGN PATENT DOCUMENTS

| | | |
|---|---|---|
| DE | 102016221309 A1 | 5/2017 |
| DE | 102017003024 A1 | 10/2018 |
| EP | 370472 A2 | 5/1990 |
| EP | 2801519 A1 | 11/2014 |
| FR | 3043357 A1 | 5/2017 |
| JP | 63-214430 A | 9/1988 |
| JP | 2001-153115 A | 6/2001 |
| JP | 2014-237429 A | 12/2014 |
| JP | 2015-187458 A | 10/2015 |
| JP | 2017-087841 A | 5/2017 |
| WO | 96/05440 A1 | 2/1996 |
| WO | 2010/024990 A1 | 3/2010 |
| WO | 2014/170690 A1 | 10/2014 |

OTHER PUBLICATIONS

Notice of Reasons for Refusal dated May 24, 2022, issued in corresponding Japanese Patent Application No. 2018-167876 with English translation.

Office Action dated Feb. 24, 2021, issued in German Patent Application No. 10 2019 213 347.9, with English translation.

Preliminary Search Report dated Jul. 28, 2021, issued in corresponding French Patent Application No. FR1909804 with English translation (26 pgs.).

Office Action dated Oct. 31, 2022, issued in corresponding French Application No. 1909804 with English translation (8 pgs.).

Office Action dated Jun. 6, 2024, issued in German Patent Application No. 102019213347.9, with English translation (14 pgs.).

* cited by examiner

JOINING OF FIBER-CONTAINING COMPOSITE MATERIAL

CROSS-REFERENCE TO RELATED APPLICATIONS

This application is a Divisional Application of U.S. Ser. No. 16/549,300, filed Aug. 23, 2019, which claims the benefit of priority from Japanese Patent Application Ser. No. 2018-167876, filed on Sep. 7, 2018, the contents of each of which is hereby incorporated by reference in their entirety.

TECHNICAL FIELD

The present disclosure relates to joining between a fiber-containing composite material and another member.

BACKGROUND

A fastening member such as a bolt is used to join another member to a composite member made of a fiber-containing composite material. In a joining structure disclosed in Japanese Patent Application Publication No. 2014-237429, a link body of an aircraft reaction link is made of the fiber-containing composite material, and the link body is joined to a bush by use of a bolt-shaped fastening member.

When a bolt hole for inserting the bolt therethrough is formed in the composite member made of the fiber-containing composite material, reinforcement fibers contained in the composite member are cut, so that strength of the composite member is decreased.

SUMMARY

An object of the present disclosure is to provide a new joining structure capable of alleviating or solving at least part of the above-described conventional problem.

More specifically, one object of the present disclosure is to join a composite member made of a fiber-containing composite material to another member without cutting reinforcement fibers contained in the composite member. Other objects of the present disclosure will be made apparent through the entire description herein.

A joining structure according to one embodiment of the present invention includes a first member and a second member, the first member having a hole extending along an axis direction, the second member including a shaft member, the shaft member being formed of a fiber-containing composite material and having a shape to fit in the hole, the second member being joined to the first member via the shaft member so that movement thereof in the axis direction is restricted.

According to the embodiment, the shaft member of the second member is disposed in the hole formed in the first member, and thus the second member is joined to the first member. Therefore, the second member can be joined to the first member without reinforcement fibers being cut, the reinforcement fibers being contained in the shaft member of the second member. Thus, it is possible to prevent a decrease in strength of the shaft member of the second member, the shaft member being made of a fiber-containing composite material.

In one embodiment of the present invention, the shaft member has a first width at a first position in the axis direction and a second width at a second position in the axis direction, the second portion being closer to a distal end of the shaft member than the first position, the second width being larger than the first width.

According to the embodiment, the first member can support the second member in the axis direction by using a portion thereof lying at the first position in the axis direction. Thus, the first member can oppose a tensile load acting on the second member in a direction from the distal end toward a proximal end of the shaft member by using the portion thereof lying at the first position in the axis direction. Therefore, according to the embodiment, it is possible to more firmly join the first member to the second member.

In one embodiment of the present invention, the shaft member has a third width at a third position in the axis direction, the third position being closer to the distal end of the shaft member than the second position, the third width being smaller than the second width.

According to the embodiment, the first member can support the second member in the axis direction by using a portion thereof lying at the third position in the axis direction. Thus, according to the embodiment, it is possible to more firmly join the first member to the second member.

In one embodiment of the present invention, the shaft member has a fourth width at a fourth position in the axis direction, the fourth position being closer to a proximal end of the shaft member than the first position, the fourth width being larger than the first width.

According to the embodiment, the first member can support the second member in the axis direction by using the portion thereof lying at the first position in the axis direction. Thus, according to the embodiment, it is possible to more firmly join the first member to the second member.

In one embodiment of the present invention, the shaft member is hollow.

According to the embodiment, it is possible to achieve a weight reduction of the second member.

In one embodiment of the present invention, the shaft member has a non-circular section in a direction perpendicular to the axis direction.

According to the embodiment, a couple of forces can be transmitted between the first member and the second member.

In one embodiment of the present invention, the first member includes a cylindrical member defining the hole, and the cylindrical member has a smaller thickness at a proximal end thereof in the axis direction than on a distal end side of the proximal end in the axis direction.

According to the embodiment, a portion of the cylindrical member formed to be thin is elastically deformed, and thus a stress acting on the cylindrical member from the shaft member can be released. Thus, even when a large stress acts on a link body, the cylindrical member is unlikely to be broken.

In one embodiment of the present invention, the cylindrical member is made of a metal.

According to the embodiment, the shaft member made of a fiber-containing composite material can be joined to the cylindrical member made of metal without the use of a joining member such as a bolt, which might break reinforcement fibers contained in the fiber-containing composite material.

In one embodiment of the present invention, the shaft member includes a first reinforcement fiber extending in a first direction. Furthermore, the shaft member includes a joining portion and a non-joining portion, the joining portion overlapping with the cylindrical member in the axis direction, the non-joining portion not overlapping with the joining portion in the axis direction. In the embodiment, an angle formed by the first direction with the axis direction in the joining portion is larger than an angle formed by the first direction with the axis direction in the non-joining portion.

In one embodiment of the present invention, the shaft member further includes a second reinforcement fiber extending in a second direction different from the first direction and woven with the first reinforcement fiber, and an angle formed by the second direction with the axis direction in the joining portion is smaller than an angle formed by the second direction with the axis direction in the non-joining portion.

According to the embodiment, in the shaft member, the second reinforcement fiber is woven with the first reinforcement fiber, and thus strength of the shaft member can be increased. Furthermore, an angle formed by an extending direction (the second direction) of the second reinforcement fiber with the axis direction is larger in the joining portion of the shaft member. Therefore, in the joining portion, the shaft member is more easily deformed in a width direction than in the non-joining portion. This makes it easy to process the shaft member into a shape to fit in the hole.

In one embodiment of the present invention, a reinforcement member is provided in the non-joining portion of the shaft member, the reinforcement member being made of a fiber-containing composite material containing reinforcement fibers oriented in a circumferential direction surrounding the axis direction.

According to the embodiment, the non-joining portion of the shaft member can be reinforced by the reinforcement member.

An aircraft reaction link according to one embodiment of the present invention includes a bush and a link body, the bush slidably supporting an actuator, the actuator being directly or indirectly mounted to a moving surface of an aircraft and configured to drive the moving surface, the link body including a shaft member made of a fiber-containing composite material and being joined to the bush. In the embodiment, the bush has a hole extending along an axis direction of the shaft member, and the shaft member is formed in a shape to fit in the hole and disposed in the hole so that movement thereof in the axis direction is restricted.

According to the embodiment, in the aircraft reaction link, the link body can be joined to the bush without a decrease in strength of the link body.

A moving surface driving device according to one embodiment of the present invention includes the above-described aircraft reaction link and an actuator directly or indirectly mounted to a moving surface of an aircraft and configured to drive the moving surface.

According to the embodiment, there is obtained a moving surface driving device including the aircraft reaction link improved in joining between the link body and the bush.

One embodiment of the present invention relates to a method for joining a first member to a second member, the first member having a hole extending along an axis direction, the second member including a shaft member made of a fiber-containing composite material. The joining method includes the steps of: (A) preparing the first member, (B) preparing a core, (C) obtaining a laminate by forming a fiber-containing composite material layer on the core, (D) inserting at least part of the laminate into the hole of the first member, (E) causing expansion of the core, and (F) obtaining the shaft member in a shape to fit in the hole by curing the fiber-containing composite material layer.

According to the embodiment, the second member including the shaft member can be joined to the first member without a decrease in strength of the shaft member, the shaft member being made of a fiber-containing composite material.

The joining method according to one embodiment of the present invention further includes the step of removing the core.

According to the embodiment, the core is removed, and thus it is possible to achieve a weight reduction of a joining structure.

In one embodiment of the present invention, a removal layer is provided on an outer surface of the core, and the fiber-containing composite material layer is formed on the removal layer.

According to the embodiment, removal of the core is facilitated.

One embodiment of the present invention relates to a method for manufacturing an aircraft reaction link connected to an actuator, the actuator being mounted to a moving surface of an aircraft and configured to drive the moving surface. The manufacturing method includes the steps of: (A) preparing a bush configured to slidably support the actuator and having a hole extending along an axis direction, (B) preparing a core, (C) obtaining a laminate by forming a fiber-containing composite material layer on the core, (D) inserting at least part of the laminate into the hole of the bush, (E) causing expansion of the core, and (F) obtaining a link body by curing the fiber-containing composite material layer.

According to the embodiment, there is obtained an aircraft reaction link in which the link body is joined to the bush without a decrease in strength of the link body.

BRIEF DESCRIPTION OF THE DRAWINGS

FIG. 15A shows a core.

FIG. 15B is a perspective view of a laminate obtained by forming a fiber-containing composite material layer on the core.

FIG. 15C is a sectional view of the laminate shown in FIG. 15B cut along a plane perpendicular to a longitudinal axis direction thereof.

FIG. 15D shows a composite laminate obtained by mounting one of bushes to a laminate and a molding die for molding the composite laminate.

FIG. 15E is a schematic view showing, in an enlarged scale, a vicinity of a distal end of the composite laminate placed in the molding die.

FIG. 15F is a schematic view showing the composite laminate after the core has been expanded in the molding die.

DESCRIPTION OF EXAMPLE EMBODIMENTS

Figure 1:
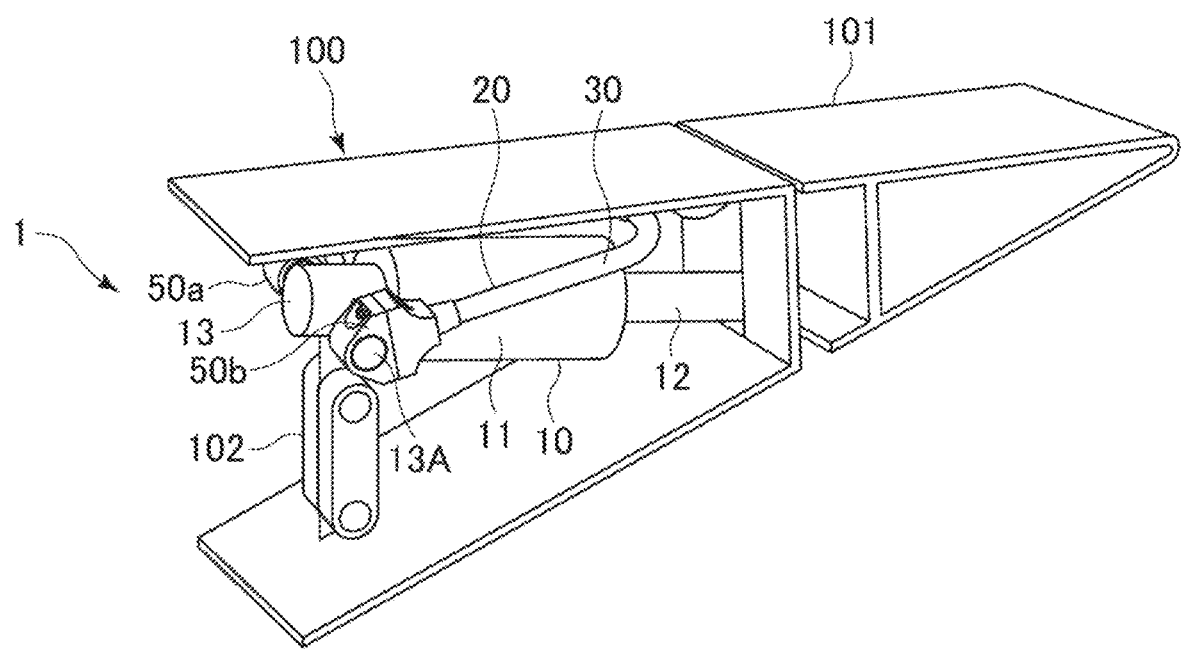
FIG. 1 is a perspective view of part of a wing including a moving surface driving device according to one embodiment of the present invention.

The following describes various embodiments of the present invention with reference to the appended drawings as appropriate. Constituent elements common to a plurality of drawings are denoted by the same reference signs throughout the plurality of drawings. It should be noted that the drawings are not necessarily depicted to scale for the sake of convenience of explanation. In the drawings, some constituent elements may be omitted for convenience of explanation.

Figure 2:
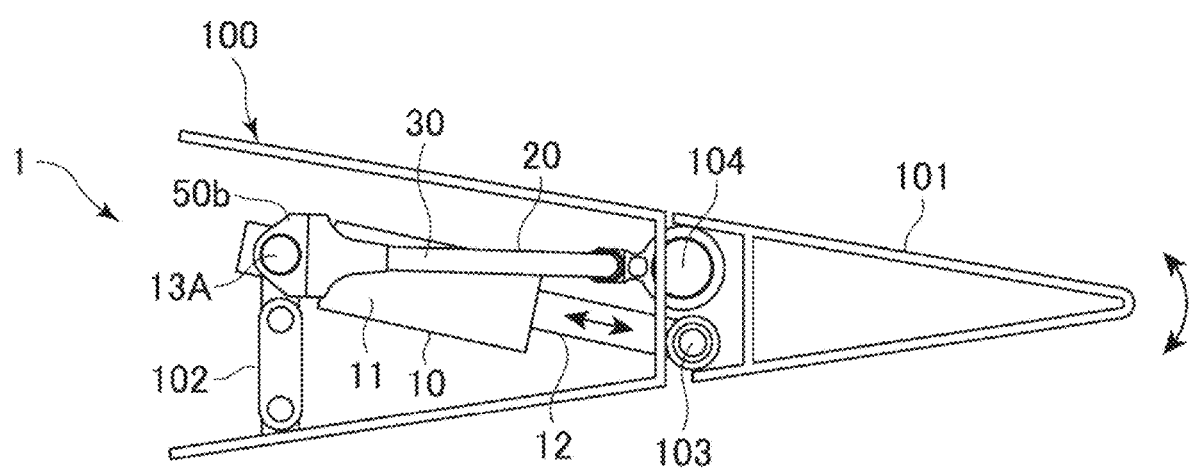
FIG. 2 is a side view of the wing shown in FIG. 1.
Figure 3:
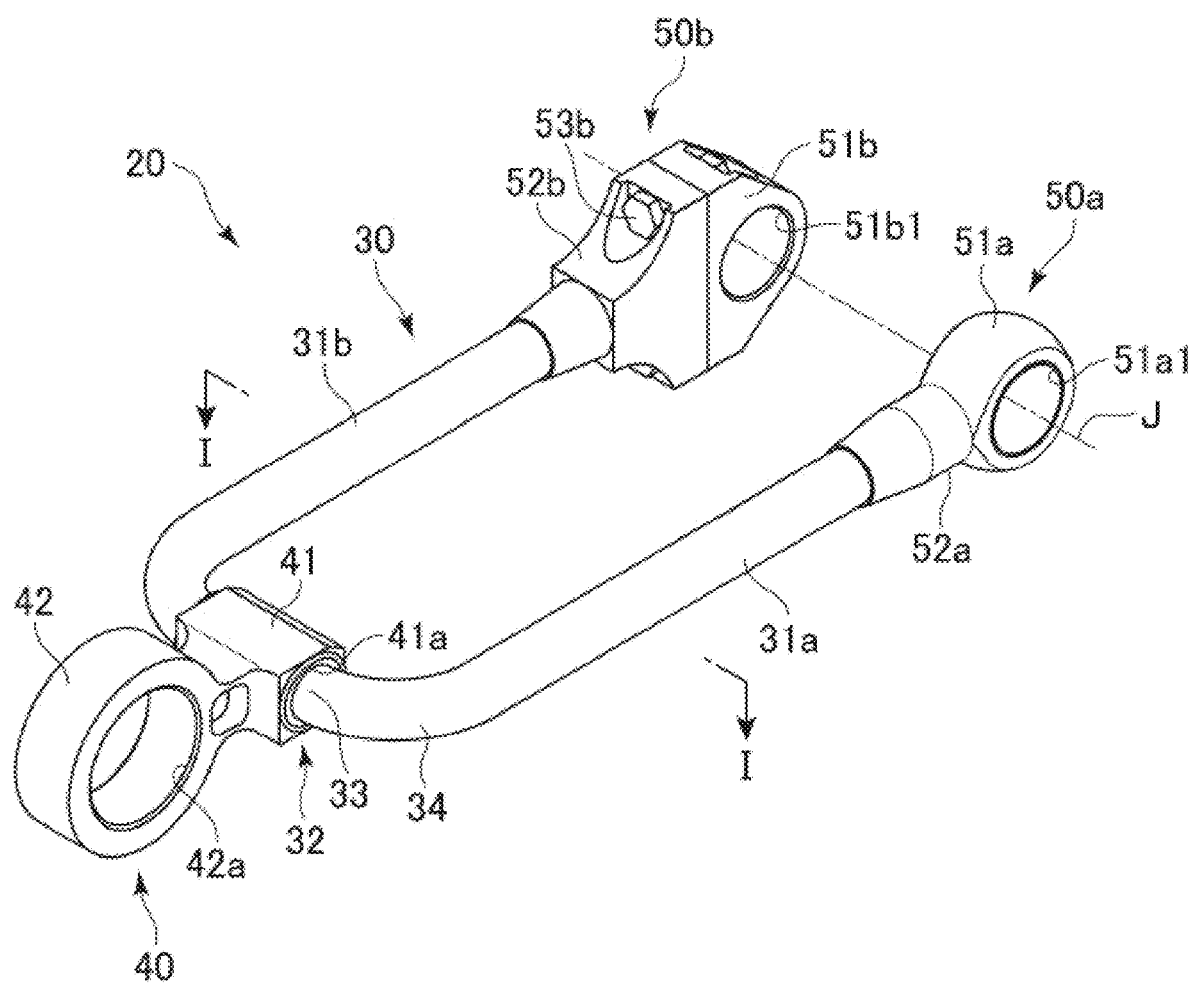
FIG. 3 is a perspective view of an aircraft reaction link shown in FIG. 1.

A moving surface driving device according to one embodiment of the present invention will now be described with reference mainly to FIG. 1 and FIG. 2. FIG. 1 is a perspective view of part of a wing including a moving surface driving device according to one embodiment of the present invention, and FIG. 2 is a side view of the wing. A moving surface driving device 1 is installed in an aircraft and configured and disposed to drive a moving surface 101 of a wing 100 of the aircraft. Examples of the moving surface 101 include primary flight control surfaces such as an aileron, a rudder, and an elevator or secondary flight control surfaces such as a flap and a spoiler.

The moving surface driving device 1 includes an actuator 10 and a reaction link 20. The actuator 10 is configured and disposed to drive the moving surface 101. The reaction link 20 is configured and disposed to support a reaction force from the moving surface 101 when the moving surface 101 is driven by the actuator 10.

The actuator 10 is connected to a support mechanism 102 provided in the wing 100 and a connection shaft 103 of the moving surface 101. The moving surface 101 is supported so as to be rotatable with respect to the wing 100 via a fulcrum shaft 104. The actuator 10 causes the moving surface 101 to rotate about the fulcrum shaft 104. A distal end portion of a rod 12 is rotatably connected to the connection shaft 103. That is, the actuator 10 is directly connected to the moving surface 101. It is also possible that the distal end portion of the rod 12 is connected to a horn arm (not shown) connected to the moving surface 101. That is, the actuator 10 may also be indirectly connected to the moving surface 101.

The actuator 10 is a fluid pressure-driven linear actuator in which a working fluid such as a hydraulic oil is supplied to and discharged from a cylinder 11, thus causing the rod 12 to reciprocate in an axis direction thereof. The actuator 10 may be an actuator driven by any other method than using a fluid pressure. For example, the actuator 10 may be an electromechanical linear actuator including an electric motor.

As shown in FIG. 1, the actuator 10 includes a connection portion 13 connected to the reaction link 20 and the support portion 102. The connection portion 13 is provided on a side of the cylinder 11 opposite to a side thereof from which the rod 12 protrudes. The connection portion 13 includes a shaft 13A extending in a direction of a support axis J orthogonal to the axis direction of the rod 12. Herein, the extending direction of the shaft 13A may be referred to as a support axis direction.

The reaction link 20 is rotatably connected to the fulcrum shaft 104 and the shaft 13A of the connection portion 13. The reaction link 20 serves to prevent a reaction force generated when the moving surface 101 is driven by the actuator 10 from directly acting on the wing 100 from the moving surface 101. The reaction link 20 may be directly or indirectly connected to the moving surface 101. The reaction link 20 may be directly or indirectly connected to the actuator 10. In a case where the reaction link 20 is indirectly connected to the moving surface 101 or the actuator 10, the reaction link 20 is connected to the moving surface 101 or the actuator 10 via a link mechanism.

The moving surface driving device 1 thus configured operates as follows. A fluid pressure device (not shown) for supplying a working fluid to the actuator 10 operates based on instructions from a flight controller (not shown), and thus the working fluid is supplied to and discharged from the cylinder 11 of the actuator 10. This causes the rod 12 to protrude from or retract into the cylinder 11 as shown in FIG. 2, and thus the moving surface 101 connected to the rod 12 via the connection shaft 103 rotates about the fulcrum shaft 104. As the moving surface 101 rotates, the reaction link 20 swings about the fulcrum shaft 104. The reaction link 20 also swings about the shaft 13A. As a result of this motion, the reaction link 20 receives, from the moving surface 101, a reaction force generated when the moving surface 101 is driven by the actuator 10.

Next, the reaction link 20 according to one embodiment of the present invention will be further described with reference to FIG. 3 to FIG. 8. As shown in these drawings, the reaction link 20 includes a link body 30 formed in a U shape in a plan view. The link body 30 may also be in a linear shape or a J shape other than the U shape.

The link body 30 includes a shaft member 31a linearly extending along a longitudinal axis A and a shaft member 31b linearly extending along a longitudinal axis B extending parallel to the longitudinal axis A. The longitudinal axis A and the longitudinal axis B indicate a longitudinal direction of the link body 30. The shaft member 31a and the shaft member 31b extend in parallel directions so as to be spaced from each other. The shaft member 31a and the shaft member 31b are formed in substantially the same shape. Herein, a description related to the shaft member 31a also applies to the shaft member 31b, unless it should be otherwise construed from the context or in view of the nature of the present invention. Herein, a direction along the longitudinal axis A may be referred to as a longitudinal axis A direction, and a direction along the longitudinal axis B may be referred to as a longitudinal axis B direction. The longitudinal axis A direction and the longitudinal axis B direction may be collectively referred to simply as an axis direction. Herein, in referring to a proximal end and a distal end of each member, the distal end is on an upper side in FIG. 4 and the proximal end is on a lower side in FIG. 4 in the direction along the longitudinal axis A (or the longitudinal axis B), unless otherwise construed from the context.

A proximal end of the shaft member 31a in the longitudinal axis A direction and a proximal end of the shaft member 31b in the longitudinal axis B direction are connected to each other via a connection portion 32. The connection portion 32 includes a straight portion 33 and bent portions 34 provided on both ends of the straight portion 33, the straight portion 33 extending in a direction orthogonal to the longitudinal axis A and the longitudinal axis B. A pair of the shaft members 31a and 31b may be formed integrally with the connection portion 32.

Figure 4:
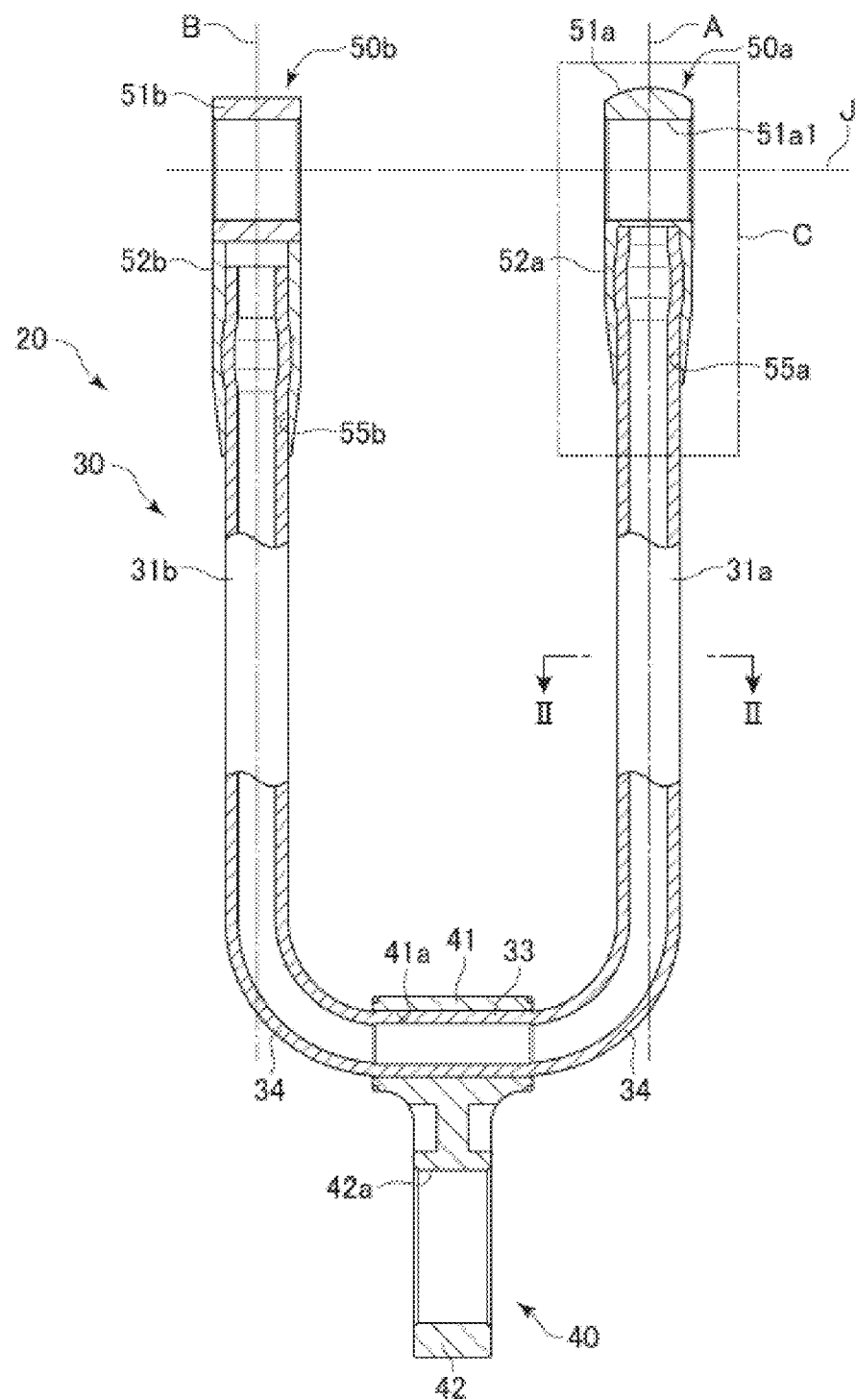
FIG. 4 is a sectional view of the aircraft reaction link shown in FIG. 1 along a line I-I.
Figure 5:
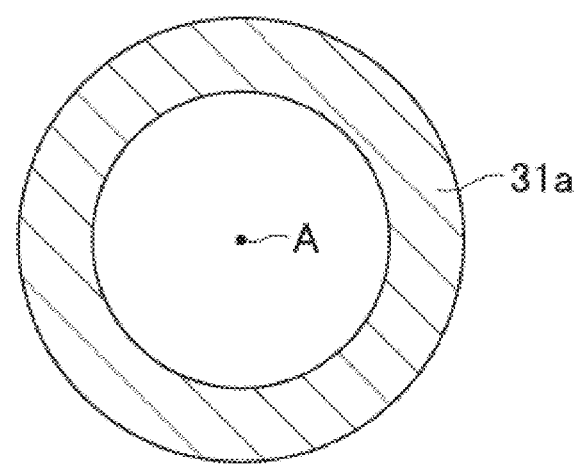
FIG. 5 is a sectional view of the aircraft reaction link shown in FIG. 4 along a line II-II.

In one embodiment of the present invention, the shaft member 31a is hollow as shown in FIG. 4 and FIG. 5. The shaft member 31a may be formed to be solid. With the shaft member 31a formed to be hollow, it is possible to achieve a weight reduction of the shaft member 31a and eventually of the link body 30. In one embodiment of the present invention, as shown in FIG. 5, the shaft member 31a is formed in a circular shape or a substantially circular shape as viewed in section. A sectional shape of the shaft member 31a is not limited to the circular shape or the substantially circular shape. Modification examples of the shaft member 31a will be described later.

An unshown upper layer may be formed on the shaft member 31a. The upper layer may be applied for various purposes. The upper layer may be applied for the purposes of, for example, imparting weather resistance to the link body 30, increasing strength of the link body 30, improving decorativeness of the link body 30, imparting a lightning protection function, or other purposes. The upper layer may be made of a fiber-containing composite material or a material other than the fiber-containing composite material. A fiber-reinforced plastic used for the upper layer may contain glass fibers as reinforcement fibers. The upper layer having the lightning protection function may be formed of, for example, a metal mesh. In order to impart the lightning protection function, a ground wire may be attached to a surface of the shaft member 31a.

A bush 50a is provided at a distal end of the shaft member 31a in the longitudinal axis A direction, and a bush 50b is provided at a distal end of the shaft member 31b in the longitudinal axis B direction.

The bushes 50a and 50b are made of, for example, a metal material. As the metal material used for the bushes 50a and 50b, a titanium alloy, chrome-molybdenum steel, nickel-chrome-molybdenum steel, stainless steel, and other known metal materials can be used. The bushes 50a and 50b may be made of a material other than the metal material. For example, the bushes 50a and 50b may be made of a ceramic material, a fiber-reinforced plastic such as CFRP, or any of various types of resin materials.

In one embodiment of the present invention, the link body 30 is made of a composite material containing fibers ("fiber-containing composite material"). The fiber-containing composite material is, for example, a fiber-reinforced plastic (FRP). Reinforcement fibers made of any of various raw materials can be used as the reinforcement fibers contained in the link body 30. For example, the link body 30 may be made of a carbon fiber-reinforced plastic (CFRP) containing carbon fibers as the reinforcement fibers. As the carbon fibers, PAN-based carbon fibers, pitch-based carbon fibers, or any other known type of carbon fibers can be used. The link body 30 may be made of a glass fiber-reinforced plastic (GFRP), a glass mat-reinforced thermoplastic (GMT), a boron fiber-reinforced plastic (BFRP), an aramid fiber-reinforced plastic (AFRP, KFRP), a Dyneema fiber-reinforced plastic (DFRP), a Zylon fiber-reinforced plastic (ZFRP), or any other type of fiber-reinforced plastic.

The link body 30 may be made entirely or partly of a fiber-containing composite material. For example, only the shaft members 31a and 31b of the link body 30 may be made of a fiber-containing composite material. In this case, the connection portion 32 may be made of a material other than the fiber-containing composite material, such as, for example, a metal material. Furthermore, in the link body 30, only part of the pair of the shaft members 31a and 31b on a distal end side thereof may be made of a fiber-containing composite material. The link body 30 may be made of a fiber-containing composite material formed of a combination of a plurality of types of fibers or a combination of a plurality of types of fiber-containing composite materials.

As described above, in one embodiment of the present invention, the shaft members 31a and 31b are made of a fiber-containing composite material. Herein, the shaft members 31a and 31b made of a fiber-containing composite material includes a configuration in which they are made entirely of the fiber-containing composite material and a configuration in which they are made partly of the fiber-containing composite material. That is, herein, the shaft members 31a and 31b made of a fiber-containing composite material refers to shaft members made at least partly of the fiber-containing composite material. For example, it is possible that a portion of the shaft member 31a to be joined to the bush 50a (an after-mentioned joining portion 35a) is made of a fiber-containing composite material, and a portion of the shaft member 31a other than the portion to be joined to the bush 50a is made of a material other than the fiber-containing composite material.

Figure 8:
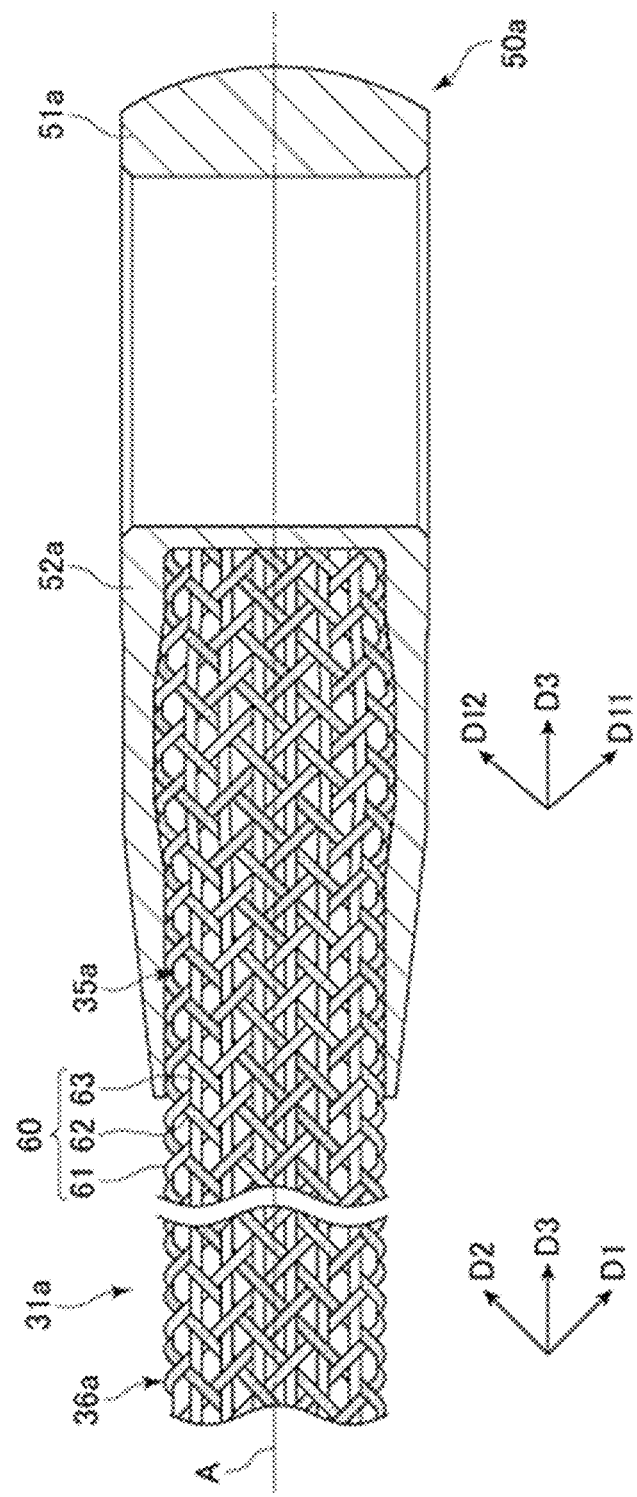
FIG. 8 is a schematic view schematically showing, in an enlarged scale, one distal end of a link body included in the aircraft reaction link shown in FIG. 1. For the sake of convenience of explanation, a bush 50*a* is shown in a broken state.

Now, an orientation of the reinforcement fibers in the shaft member 31a will be further described with reference to FIG. 8. As shown in FIG. 8, the shaft member 31a includes a plurality of reinforcement fibers 60. A matrix resin is filled in a gap between the reinforcement fibers 60. For clear representation of the reinforcement fibers 60, the matrix resin is omitted in FIG. 8.

The reinforcement fibers 60 include a first reinforcement fiber 61, a second reinforcement fiber 62, and a third reinforcement fiber 63. The first reinforcement fiber 61, the second reinforcement fiber 62, and the third reinforcement fiber 63 are each a filament bundle composed of a large number of monofilaments. It is possible that the first reinforcement fiber 61, the second reinforcement fiber 62, and the third reinforcement fiber 63 are each a monofilament, a staple yarn produced by staple spinning, a filament, or a braid that is a knitted cord including tows. The first reinforcement fiber 61, the second reinforcement fiber 62, and the third reinforcement fiber 63 may be made of the same material or different materials.

The first reinforcement fiber 61 extends in a first direction D1 different from the longitudinal axis A. The second reinforcement fiber 62 extends in a second direction D2 different from the longitudinal axis A and the first direction D1. The third reinforcement fiber 63 extends in a third direction D3 parallel to the longitudinal axis A. In the embodiment shown, an acute angle formed by the first direction D1 with the longitudinal axis A is, for example, 45°, and an acute angle formed by the second direction D2 with the longitudinal axis A is, for example, 45° in a direction opposite to the first direction D1. Each of the first direction D1 and the second direction D2 can form any angle with the longitudinal axis A.

In the embodiment shown, the first reinforcement fiber 61, the second reinforcement fiber 62, and the third reinforcement fiber 63 are woven together. It is possible that the first to third reinforcement fibers 61 to 63 are not woven together but form respective layers stacked together in the order of, for example, the first reinforcement fiber 61, the second reinforcement fiber 62, and the third reinforcement fiber 63. The order of stacking the first reinforcement fiber 61, the second reinforcement fiber 62, and the third reinforcement fiber 63 may be changed desirably.

As shown in FIG. 8, in one embodiment, an angle formed by an angle D11 of the first reinforcement fiber 61 with the longitudinal axis A in the joining portion 35a of the shaft member 31a is larger than an angle formed by the angle D1 of the first reinforcement fiber 61 with the longitudinal axis A in the non-joining portion 36a of the shaft member 31a. That is, in the joining portion 35a, an extending direction of the first reinforcement fiber 61 is directed more perpendicularly to the longitudinal axis A than in the non-joining portion 36a. Similarly, an angle formed by an angle D12 of the second reinforcement fiber 62 with the longitudinal axis A in the joining portion 35a of the shaft member 31a is larger than an angle formed by the angle D2 of the second reinforcement fiber 62 with the longitudinal axis A in the non-joining portion 36a of the shaft member 31a. That is, in the joining portion 35a, an extending direction of the second reinforcement fiber 62 is directed more perpendicularly to the longitudinal axis A than in the non-joining portion 36a.

A head 40 is provided at a proximal end of the link body 30. The head 40 is connected to the fulcrum shaft 104. In the embodiment shown, the head 40 is connected to the middle of the straight portion 33 of the connection portion 32. The head 40 includes a first body 41 and a second body 42. The first body 41 has a mounting hole 41a into which the connection portion 32 is inserted. The second body 42 has a through hole 42a extending in the same direction as an extending direction of the mounting hole 41a. An unshown bearing may be mounted to the through hole 42a. The through hole 42a rotatably supports the fulcrum shaft 104 via the bearing.

As described above, the bush 50a is joined to the distal end of the shaft member 31a of the link body 30. A joining structure composed of the link body 30 and the bush 50a joined to the link body 30 is one embodiment of a joining structure according to the present invention. Similarly, the bush 50b is joined to the distal end of the shaft member 31b of the link body 30. A joining structure composed of the link body 30 and the bush 50b joined to the link body 30b is also one example of the joining structure according to the present invention.

Figure 6:
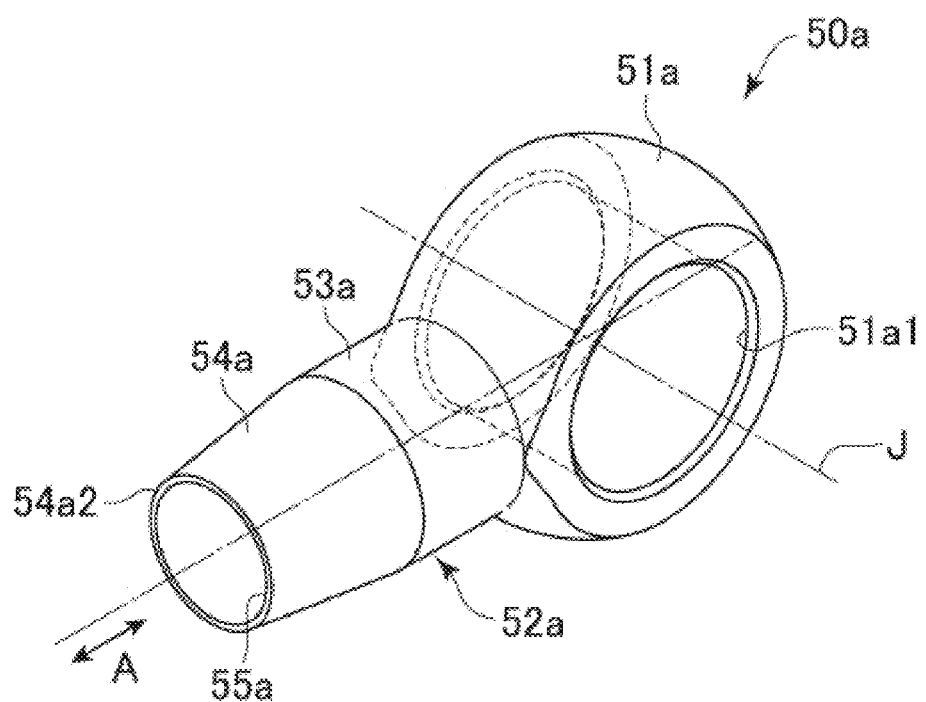
FIG. 6 is a perspective view of a bush included in the aircraft reaction link shown in FIG. 1.
Figure 7:
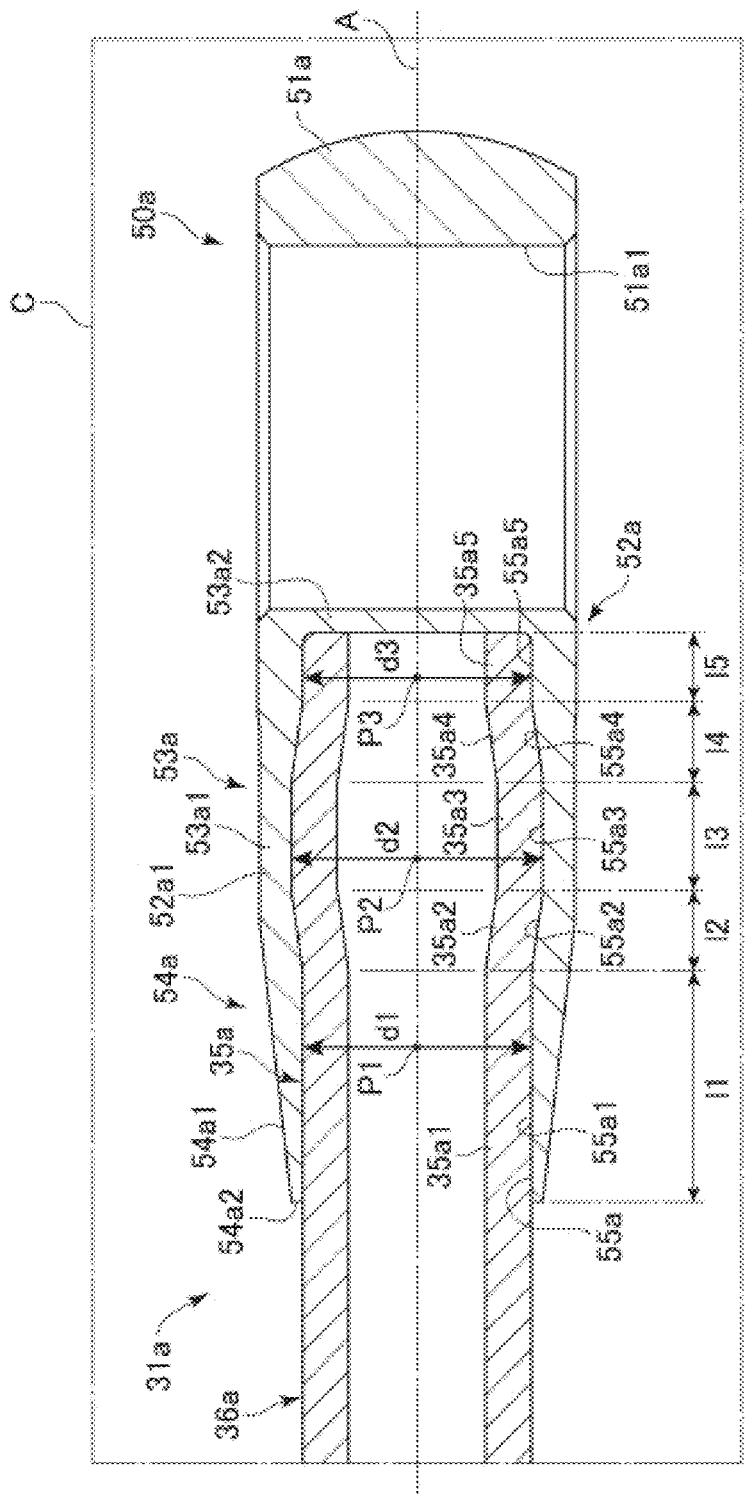
FIG. 7 is an enlarged sectional view showing, in an enlarged scale, part of the aircraft reaction link shown in FIG. 1. This enlarged sectional view shows a joining structure between a shaft member and the bush included in the aircraft reaction link shown in FIG. 1.

Hereinafter, the joining structure composed of the shaft member 31a of the link body 30 and the bush 50a and the joining structure composed of the shaft member 31b of the link body 30 and the bush 50b will be described with reference mainly to FIG. 6 and FIG. 7. The joining structure composed of the shaft member 31b and the bush 50b is substantially the same as the joining structure composed of the shaft member 31a and the bush 50a, and thus the following mainly describes the joining structure composed of the shaft member 31a and the bush 50a, omitting a description of the joining structure composed of the shaft member 31b and the bush 50b.

First, the bush 50a will now be described. FIG. 6 is a perspective view of the bush 50a when not mounted to the link body 30, and FIG. 7 is an enlarged sectional view showing, in an enlarged scale, part of the aircraft reaction link 20. This enlarged sectional view shows the joining structure composed of the shaft member 31a included in the aircraft reaction link 20 and the bush 50a.

As shown, the bush 50a includes a bush body 51a and a cylindrical member 52a extending from the bush body 51a toward a proximal end side of the longitudinal axis A. The bush body 51a may be formed integrally with the cylindrical member 52a.

The bush body 51a has a through hole 51a1. The through hole 51a1 extends through the bush body 51a along an axis direction J of the shaft 13A.

The cylindrical member 52a includes a cylindrical base portion 53a connected to the bush body 51a and an opening portion 54a extending from the base portion 53a toward the proximal end side of the longitudinal axis A and being open toward the proximal end side of the longitudinal axis A. The cylindrical member 52a has a hole 55a extending along the longitudinal axis A.

In the embodiment shown, the base portion 53a includes a ring-shaped side wall 53a1 having substantially uniform outer and inner widths and a bottom wall 53a2 provided at a distal end of the side wall 53a1 in the longitudinal axis A direction. As described above, the base portion 53a is formed in a bottomed cylindrical shape having the bottom wall 53a2. The base portion 53a is connected at the bottom wall 53a2 to the bush body 51a.

In the embodiment shown, the opening portion 54a has a ring-shaped side wall 54a1. The side wall 54a1 is connected to a proximal end of the side wall 53a1 of the base portion 53a in the longitudinal axis A direction. The side wall 54a1 extends from a position at which it connects to the side wall 53a1 to an opening end 54a2 substantially along the longitudinal axis A. In the embodiment shown, at a proximal end portion of the side wall 54a1 close to a proximal end thereof in the longitudinal axis A direction, the side wall 54a1 has an outer width (a dimension in a width direction orthogonal to the longitudinal axis A direction) smaller than at a distal end portion thereof closer to a distal end thereof than the proximal end portion in the longitudinal axis A direction. In one embodiment, the opening portion 54a is configured to have an outer width (a dimension in a width direction orthogonal to the longitudinal axis A direction) smaller toward a proximal end of the longitudinal axis A. Thus, the opening portion 54a is configured to have a thickness at a proximal end thereof in the longitudinal axis A direction (namely, a thickness at the opening end 54a2) smaller than a thickness thereof at a position closer to a distal end thereof than the opening end 54a2 in the longitudinal axis A direction. According to the embodiment, a portion of the cylindrical member 52a at a vicinity of the opening end 54a2, the portion being formed to be thin, is elastically deformed, and thus even when the shaft member 31a moves in the longitudinal axis A direction, a stress caused by the movement and acting on the cylindrical member 52a from the shaft member 31a can be released. Thus, the shaft member 31a and the cylindrical member 52a are unlikely to be broken. The cylindrical member 52a may be formed to have a thickness smaller toward a proximal end thereof in the longitudinal axis A direction.

In the embodiment shown, the hole 55a formed in the cylindrical member 52a extends from the opening end 54a2 of the opening portion 54a to the bottom wall 53a2 of the base portion 53a substantially along the longitudinal axis A direction. The hole 55a is defined by inner surfaces of the side wall 53a1 and the bottom wall 53a2 of the base portion 53a as well as an inner surface of the side wall 54a1 of the opening portion 54a.

In the embodiment shown, an inner surface of the hole 55a includes a first inner surface 55a1 extending from the opening end 54a2 in a direction parallel to the longitudinal axis A, a second inner surface 55a2 extending from a distal end of the first inner surface 55a1 in the longitudinal axis A direction so as to be inclined with respect to the longitudinal axis A, a third inner surface 55a3 extending, in the direction parallel to the longitudinal axis A, from a distal end of the second inner surface 55a2 in the longitudinal axis A direction, a fourth inner surface 55a4 extending from a distal end of the third inner surface 55a3 in the longitudinal axis A direction so as to be inclined with respect to the longitudinal axis A, and a fifth inner surface 55a5 extending, in the direction parallel to the longitudinal axis A, from a distal end of the fourth inner surface 55a4 in the longitudinal axis A direction. The inner surface 55a2 is inclined in a direction away from the longitudinal axis A toward the distal end thereof in the longitudinal axis A direction. The inner surface 55a4 is inclined in a direction toward the longitudinal axis A toward the distal end thereof in the longitudinal axis A direction. The first inner surface 55a1, the second inner surface 55a2, the third inner surface 55a3, the fourth inner surface 55a4, and the fifth inner surface 55a5 extend in a direction of the longitudinal axis A for distances l1, l2, l3, l4, and l5, respectively.

In one embodiment of the present invention, the hole 55a is formed to have a width (a dimension in a width direction orthogonal to the longitudinal axis A direction) varying depending on a position in the longitudinal axis A direction. That is, the cylindrical member 52a is formed to have a width varying depending on a position in the longitudinal axis A direction. In the embodiment shown, the hole 55a has a first width d1 at a position P1 in the longitudinal axis A direction, a second width d2 at a position P2 in the longitudinal axis A direction, and a third width d3 at a position P3 in the longitudinal axis A direction. In the direction of the longitudinal axis A, the position P1 lies within an area in which the first inner surface 55a1 extends. The position P2 is at a position closer to the distal end than the position P1 in the longitudinal axis A direction. For example, in the longitudinal axis A direction, the position P2 lies within an area in which the third inner surface 55a3 extends. The position P3 is at a position closer to the distal end than the position P2 in the longitudinal axis A direction. For example, in the longitudinal axis A direction, the position P3 lies within an area in which the fifth inner surface 55a5 extends. In the embodiment shown, the second width d2 is larger than the first width d1 and the third width d3. The third width d3 may be equal to the first width d1 or smaller or larger than the first width d1. As described above, in the embodiment shown, at a position corresponding to the third inner surface 55a3, the hole 55a formed in the cylindrical member 52a has a width larger than at any other position. Herein, a portion of the cylindrical member 52a corresponding to the inner surface 55a3 in the longitudinal axis A direction may be referred to as a wide portion 52a1. Herein, a width of any constituent member of the bush 50a or the hole 55a may refer to a dimension of the any constituent member or the hole 55a in a width direction orthogonal to the longitudinal axis A direction. For example, the first width d1 of the hole 55a at the position P1 may refer to a dimension of the hole 55a in a width direction thereof at the position P1. In the longitudinal axis A direction, the position P1 is an example of the first position, the position P2 is an example of the second position, and the position P3 is an example of the third position.

The bush 50b includes a bush body 51b and a fitting 52b joined to the distal end of the shaft member 31b. The bush body 51b is fastened to the fitting 52b by use of a fastening member 53b. The bush body 51b has a through hole 51b1. The through-hole 51b1 extends through the bush body 51b along the axis direction J of the shaft 13A.

The fitting 52b of the bush 50b has a hole 55b extending along the axis direction B. The hole 55b extends through the fitting 52b along the axis direction B. An inner peripheral surface of the hole 55b is similar in shape to an inner peripheral surface of the hole 55a, and a detailed description thereof, therefore, is omitted.

The joining portion 35a at the distal end of the shaft member 31a is housed in the hole 55a of the cylindrical member 52a. Herein, a portion of the shaft member 31a covered by the cylindrical member 52a may be referred to as the joining portion 35a, and a portion of the shaft member 31a not covered by the cylindrical member 52a may be referred to as the non-joining portion 36a.

The joining portion 35a of the shaft member 31a is formed in a shape to fit in the hole 55a of the cylindrical member 52a. In the embodiment shown, the joining portion 35a includes a first portion 35a1 extending, in the direction parallel to the longitudinal axis A, from a position in the longitudinal axis A direction corresponding to the opening end 54a2 of the cylindrical member 52a, a second portion 35a2 extending from a distal end of the first portion 35a1 in the longitudinal axis A direction so as to be inclined with respect to the longitudinal axis A, a third portion 35a3 extending, in the direction parallel to the longitudinal axis A, from a distal end of the second portion 35a2 in the longitudinal axis A direction, a fourth portion 35a4 extending from a distal end of the third portion 35a3 in the longitudinal axis A direction so as to be inclined with respect to the longitudinal axis A, and a fifth portion 35a5 extending, in the direction parallel to the longitudinal axis A, from a distal end of the fourth portion 35a4 in the longitudinal axis A direction. In one embodiment, the first portion 35a1, the second portion 35a2, the third portion 35a3, the fourth portion 35a4, and the fifth portion 35a5 each extend along a corresponding one of the first inner surface 55a1, the second inner surface 55a2, the third inner surface 55a3, the fourth inner surface 55a4, and the fifth inner surface 55a5. In one embodiment, the first portion 35a1, the second portion 35a2, the third portion 35a3, the fourth portion 35a4, and the fifth portion 35a5 each have an outer surface formed to tightly adhere to a corresponding one of the first inner surface 55a1, the second inner surface 55a2, the third inner surface 55a3, the fourth inner surface 55a4, and the fifth inner surface 55a5. The joining portion 35a has a width (outer width) equal to a width (inner width) of the inner surface of the hole 55a. As described above, the hole 55a has the first width d1 at the position P1 in the longitudinal axis A direction, the second width d2 at the position P2 in the longitudinal axis A direction, and the third width d3 at the position P3 in the longitudinal axis A direction, and thus the joining portion 35a is formed to have a width d1 at the first portion 35a1 lying at the position P1, a width d2 at the third portion 35a3 lying at the position P2, and a width d3 at the fifth portion 35a5 lying at the position P3. As described above, the joining portion 35a of the shaft member 31a is configured to have the width d1 at the position P1 in the longitudinal axis A direction and the width d2 at the position P2 closer to the distal end than the position P1 in the longitudinal axis A direction, the width d2 being larger than the width d1. Furthermore, the joining portion 35a of the shaft member 31a is configured to have the width d3 at the position P3 closer to the distal end than the position P2 in the longitudinal axis A direction, the width d3 being smaller than the width d2.

The joining portion 35a is formed in a shape conforming to the inner surface of the cylindrical member 52a defining the hole 55a, and thus at any position on the longitudinal axis A, the joining portion 35a has a width (outer width) equal to the width (inner width) of the hole 55a. Therefore, the joining portion 35a has the width d1 at the position P1 on the longitudinal axis A, the width d2 at the position P2, and the width d3 at the position P3 on the longitudinal axis A.

In the above-described joining structure between the link body 30 and the bush 50a, the shaft member 31a of the link body 30 is formed in a shape to fit in the hole 55a, and the shaft member 31a formed in such a shape is disposed in the hole 55a. Thus, in the hole 55a, movement of the shaft member 31a in the longitudinal axis A direction is restricted, and the shaft member 31a is prevented from falling off the hole 55a. Therefore, the link body 30 is joined to the bush 50a via the shaft member 31a without reinforcement fibers being cut, the reinforcement fibers being contained in the shaft member 31a. As described above, in the boding structure formed by joining the link body 30 to the bush 50a, it is possible to prevent a decrease in strength of the shaft member 31a made of a fiber-reinforced plastic. Similarly thereto, the link body 30 is joined to the bush 50b via the shaft member 31b without reinforcement fibers being cut, the reinforcement fibers being contained in the shaft member 31b. It is also possible to use an adhesive to join the shaft member 31a to the bush 50a and to join the shaft member 31b to the bush 50b. Also in the case of using an adhesive, reinforcement fibers contained in the shaft member 31a and the shaft member 31b are prevented from being cut.

In the above-described joining structure between the link body 30 and the bush 50a, the bush 50a has the wide portion 52a1, and the wide portion 52a1 receives the third portion 35a3 of the shaft member 31a, the third portion 35a3 being formed to be wide. Thus, the bush 50a supports the third portion 35a3 of the shaft member 31a in the longitudinal axis A direction by using a portion thereof closer to the proximal end than the wide portion 52a1 in the longitudinal axis A direction. Specifically, when a tensile load toward the proximal end in the longitudinal axis A direction acts on the link body 30, the tensile load is received by the inclined inner surface 55a2 of the hole 55a of the bush 50a. Accordingly, when a tensile load toward the proximal end in the longitudinal axis A direction acts on the link body 30, the bush 50a can oppose the tensile load by using the inner surface 55a2. Thus, the shaft member 31a can be more reliably prevented from falling off the hole 55a, so that the link body 30 can be joined more firmly to the bush 50a.

Furthermore, the bush 50a supports the third portion 35a3 of the shaft member 31a in the longitudinal axis A direction by using a portion thereof closer to the distal end than the wide portion 52a1 in the longitudinal axis A direction. Specifically, when a compressive load toward the distal end in the longitudinal axis A direction acts on the link body 30, the compressive load is received by the inclined inner surface 55a4 of the hole 55a of the bush 50a. Accordingly, when a compressive load toward the distal end in the longitudinal axis A direction acts on the link body 30, the bush 50a can oppose the compressive load by using the inner surface 55a4. Thus, the link body 30 can be joined more firmly to the bush 50a. Furthermore, a compressive load acting on the link body 30 is opposed by using the inner surface 55a4, and thus it is possible to prevent a stress from being concentrated on the distal end of the shaft member 31a. Thus, it is possible to prevent the shaft member 31a from buckling due to a compressive load.

In the foregoing embodiment, an angle formed by the first reinforcement fiber 61 contained in the shaft member 31a with the longitudinal axis A direction in the joining portion 35a is larger than an angle formed by the first reinforcement fiber 61 with the longitudinal axis A direction in the non-joining portion 36a. Therefore, in the joining portion 35a, the shaft member 31a is more easily deformed in the width direction than in the non-joining portion 36a. This makes it easy to process the shaft member 31a into a shape to fit in the hole 55a.

In the foregoing embodiment, the first reinforcement fiber 61 is woven with the second reinforcement fiber 62. Thus, strength of the shaft member 31a can be increased. Furthermore, an angle formed by the second reinforcement fiber 62 with the longitudinal axis A direction in the joining portion 35a is smaller than an angle formed by the second reinforcement fiber 62 with the longitudinal axis A direction in the non-joining portion 36a. This makes it easy to process the shaft member 31a into a shape to fit in the hole 55a.

Figure 9:
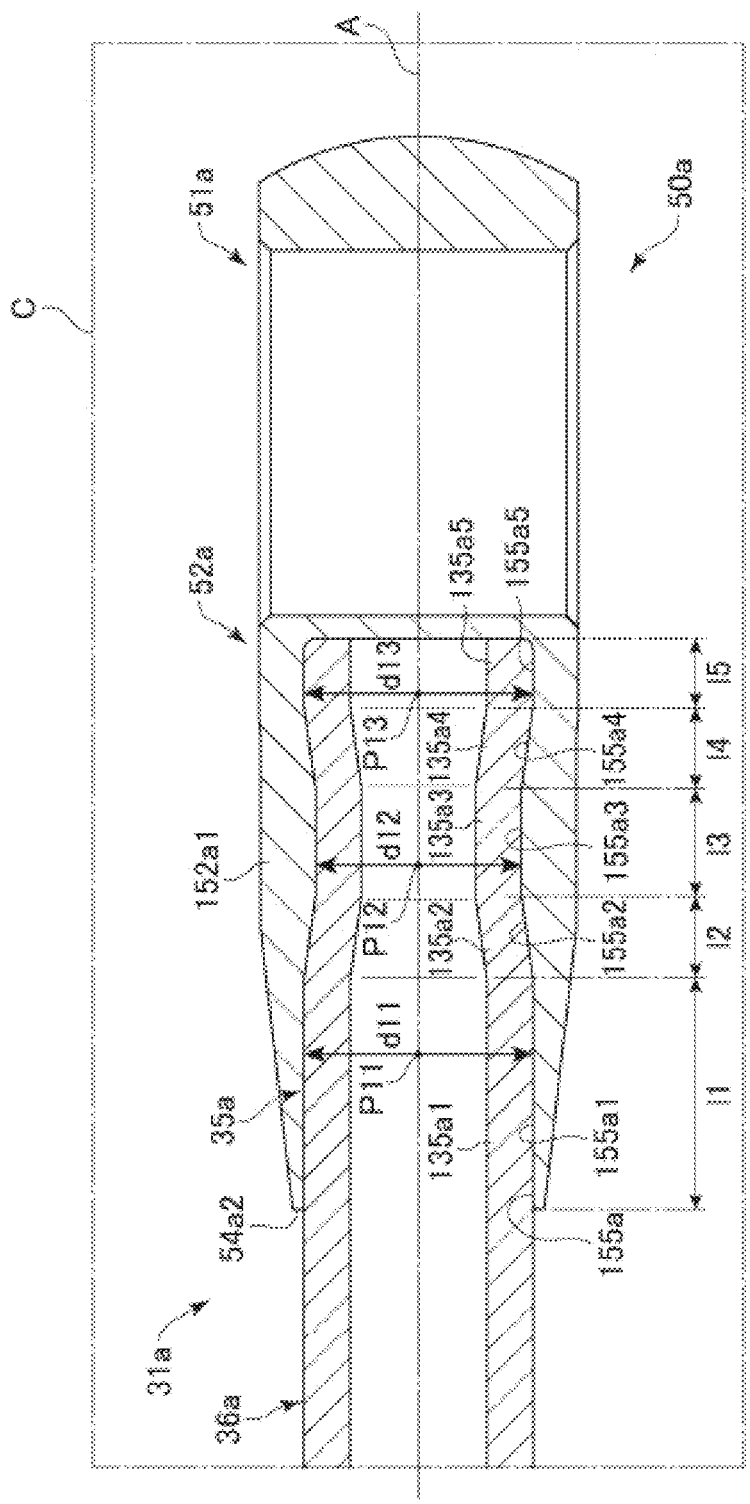
FIG. 9 is an enlarged sectional view showing, in an enlarged scale, part of an aircraft reaction link according to another embodiment of the present invention. This enlarged sectional view shows a joining structure between a shaft member and a bush included in the aircraft reaction link according to another embodiment.

The joining structure between the shaft member 31a and the hole 55a in the foregoing embodiment is merely one embodiment of the present invention, and the shape of the hole 55a and the shape of the shaft member 31a to be fitted therein can be changed as appropriate. An example of another embodiment of the joining structure formed by joining the link body 30 to the bush 50a will now be described with reference to FIG. 9. FIG. 9 shows a joining structure between a shaft member and a hole in another embodiment of the present invention.

As shown in FIG. 9, in the joining structure according to another embodiment of the present invention, a cylindrical member 52a has a hole 155a instead of the hole 55a. As shown, an inner surface of the hole 155a includes a first inner surface 155a1 extending from an opening end 54a2 in a direction parallel to a longitudinal axis A, a second inner surface 155a2 extending from a distal end of the first inner surface 155a1 in a longitudinal axis A direction so as to be inclined with respect to the longitudinal axis A, a third inner surface 155a3 extending, in the direction parallel to the longitudinal axis A, from a distal end of the second inner surface 155a2 in the longitudinal axis A direction, a fourth inner surface 155a4 extending from a distal end of the third inner surface 155a3 in the longitudinal axis A direction so as to be inclined with respect to the longitudinal axis A, and a fifth inner surface 155a5 extending, in the direction parallel to the longitudinal axis A, from a distal end of the fourth inner surface 155a4 in the longitudinal axis A direction. The inner surface 155a2 is inclined in a direction toward the longitudinal axis A toward a distal end thereof in the longitudinal axis A direction. The inner surface 155a4 is inclined in a direction away from the longitudinal axis A toward a distal end thereof in the longitudinal axis A direction. Therefore, in the embodiment shown in FIG. 9, a bush 50a includes a bulge portion 152a1 bulging inwardly in a width direction of the hole 155a.

In the embodiment shown, the hole 155a has a first width d11 at a position P11 in the longitudinal axis A direction, a second width d12 at a position P12 in the longitudinal axis A direction, and a third width d13 at a position P13 in the longitudinal axis A direction. In the direction of the longitudinal axis A, the position P11 lies within an area in which the first inner surface 155a1 extends. The position P12 is at a position closer to the distal end than the position P11 in the longitudinal axis A direction. For example, in the longitudinal axis A direction, the position P12 lies within an area in which the third inner surface 155a3 extends. The position P13 is at a position closer to the distal end than the position P12 in the longitudinal axis A direction. For example, in the longitudinal axis A direction, the position P13 lies within an area in which the fifth inner surface 155a5 extends. In the embodiment shown, the second width d12 is smaller than the first width d11 and the third width d13. The third width d13 may be equal to the first width d11 or smaller or larger than the first width d11. As described above, in the embodiment shown, at a position corresponding to the third inner surface 155a3, the hole 155a formed in a cylindrical member 152a has a width smaller than at any other position. In the longitudinal axis A direction, the position P12 is an example of the first position, the position P13 is an example of the second position, and the position P11 is an example of the fourth position.

In the embodiment shown in FIG. 9, a joining portion 35a of a shaft member 31a is formed in a shape to fit in the hole 155a of the cylindrical member 52a. Specifically, in the embodiment shown, the joining portion 35a includes a first portion 135a1 extending, in the direction parallel to the longitudinal axis A, from a position in the longitudinal axis A direction corresponding to the opening end 54a of the cylindrical member 52a, a second portion 135a2 extending from a distal end of the first portion 135a1 in the longitudinal axis A direction so as to be inclined with respect to the longitudinal axis A, a third portion 135a3 extending, in the direction parallel to the longitudinal axis A, from a distal end of the second portion 135a2 in the longitudinal axis A direction, a fourth portion 135a4 extending from a distal end of the third portion 135a3 in the longitudinal axis A direction so as to be inclined with respect to the longitudinal axis A, and a fifth portion 135a5 extending, in the direction parallel to the longitudinal axis A, from a distal end of the fourth portion 135a5 in the longitudinal axis A direction. In one embodiment, the first portion 135a1, the second portion 135a2, the third portion 135a3, the fourth portion 135a4, and the fifth portion 135a5 each extend along a corresponding one of the first inner surface 155a1, the second inner surface 155a2 the third inner surface 155a3, the fourth inner surface 155a4, and the fifth inner surface 155a5. In one embodiment, the first portion 135a1, the second portion 135a2, the third portion 135a3, the fourth portion 135a4, and the fifth portion 135a5 each have an outer surface formed to tightly adhere to a corresponding one of the first inner surface 155a1, the second inner surface 155a2, the third inner surface 155a3, the fourth inner surface 155a4, and the fifth inner surface 155a5. The joining portion 35a has a width (outer width) equal to a width (inner width) of the inner surface of the hole 155a. Therefore, the joining portion 35a is formed to have a width d11 at the first portion 135a1 lying at the position P11, a width d12 at the third portion 135a3 lying at the position P12, and a width d13 at the fifth portion 35a5 lying at the position P3. As described above, the joining portion 35a of the shaft member 31a is configured to have the width d12 at the position P12 in the longitudinal axis A direction and the width d13 at the position P13 closer to the distal end than the position P12 in the longitudinal axis A direction, the width d13 being larger than the width d12. Furthermore, the joining portion 35a of the shaft member 31a is configured to have the width d11 at the position P11 closer to the proximal end than the position P12 in the longitudinal axis A direction, the width d11 being larger than the width d12.

In the joining structure of the embodiment, the bush 50a has the bulge portion 152a1, and the bulge portion 152a1 is received by the third portion 135a3 of the shaft member 31a, the third portion 135a3 being formed to be narrow. Thus, the bush 50a supports the first portion 135a1 of the shaft member 35a1 in the longitudinal axis A direction by using a portion thereof closer to the distal end than the bulge portion 152a1 in the longitudinal axis A direction. Specifically, when a compressive load toward the distal end in the longitudinal axis A direction acts on a link body 30, the compressive load is received by the inclined inner surface 155a2 of the hole 155a of the bush 50a. Accordingly, when a compressive load toward the distal end in the longitudinal axis A direction acts on the link body 30, the bush 50a can oppose the compressive load by using the inner surface 155a2. Accordingly, when a compressive load toward the distal end in the longitudinal axis A direction acts on the link body 30, the bush 50a can oppose the compressive load by using the inner surface 155a2. Thus, the link body 30 can be joined firmly to the bush 50a. Furthermore, a compressive load acting on the link body 30 is opposed by using the inner surface 155a2, and thus it is possible to prevent the shaft member 31a from buckling due to the compressive load.

Furthermore, the bush 50a supports the fifth portion 135a5 of the shaft member 31a in the longitudinal axis A direction by using a portion thereof closer to the distal end than the bulge portion 152a1 in the longitudinal axis A direction. Specifically, when a tensile load toward the proximal end in the longitudinal axis A direction acts on the link body 30, the tensile load is received by the inclined inner surface 155a4 of the hole 155a of the bush 50a. Accordingly, when a tensile load toward the distal end in the longitudinal axis A direction acts on the link body 30, the bush 50a can oppose the tensile load by using the inner surface 155a4. Thus, the link body 30 can be joined more firmly to the bush 50a.

The joining structure to which the present invention is applied may take various other forms than the embodiment shown in FIG. 9. For example, the cylindrical member 52a may have any other portion formed to be wide in addition to the wide portion 52a1. Furthermore, the cylindrical member 52a may have any other portion formed to protrude inwardly in the width direction in addition to the bulge portion 152a1. The hole 55a and the hole 155a may be formed in various shapes able to receive the shaft member 31a.

Figure 10:
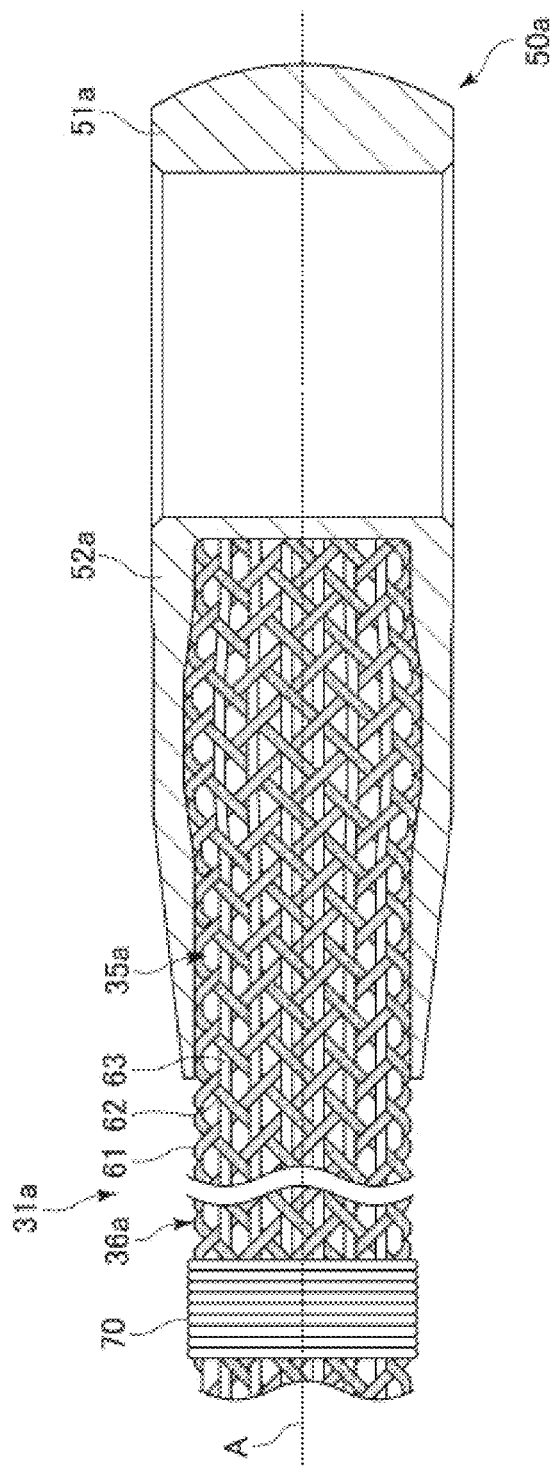
FIG. 10 is a schematic view schematically showing, in an enlarged scale, one distal end of a link body included in the aircraft reaction link according to another embodiment of the present invention. For the sake of convenience of explanation, a bush 50*a* is shown in a broken state.
Figure 11:
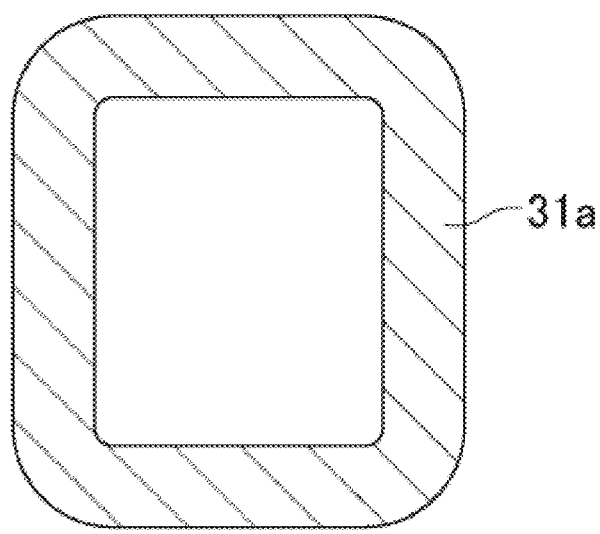
FIG. 11 is a sectional view of the aircraft reaction link according to another embodiment of the present invention cut along a plane perpendicular to a longitudinal axis direction thereof.
Figure 12:
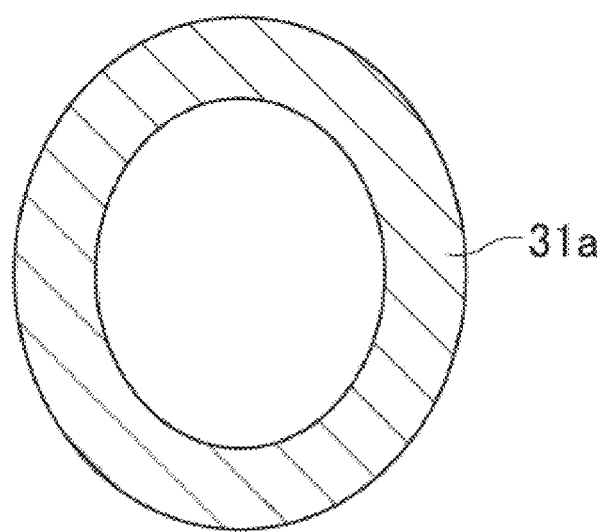
FIG. 12 is a sectional view of the aircraft reaction link according to another embodiment of the present invention cut along the plane perpendicular to the longitudinal axis direction thereof.

Next, modification examples of the link body 30 will now be described with reference to FIG. 10 to FIG. 12. FIG. 10 is a schematic view schematically showing, in an enlarged scale, one distal end of a link body included in an aircraft reaction link according to another embodiment of the present invention. FIG. 11 is a sectional view of the aircraft reaction link according to another embodiment of the present invention cut along a plane perpendicular to a longitudinal axis A direction thereof. FIG. 12 is a sectional view of the aircraft reaction link according to another embodiment of the present invention cut along the plane perpendicular to the longitudinal axis A direction thereof.

As shown in FIG. 10, a link body 30 according to another embodiment of the present invention includes a reinforcement member 70. The reinforcement member 70 is formed of a sheet made of a fiber-reinforced plastic. The reinforcement member 70 is formed of, for example, a fiber-reinforced plastic sheet containing reinforcement fibers oriented in a circumferential direction of a shaft member 31*a*. As the reinforcement fibers contained in the reinforcement member 70, reinforcement fibers of the same type as the reinforcement fibers 61 can be used. In one embodiment, the reinforcement member 70 is provided at a portion of the link body 30 other than a joining portion 35*a* of the shaft member 31*a*. For example, the reinforcement member 70 is provided at a connection portion 32 and/or a non-joining portion 36*a* of the shaft member 31*a*. The reinforcement member 70 is provided at a portion other than the joining portion 35*a*, and thus in forming the joining portion 35*a* in a shape to fit in a hole 55*a*, the reinforcement member 70 does not interfere with processing of the joining portion 35*a*.

As shown in FIG. 11 and FIG. 12, the shaft member 31*a* of the link body 30 may be formed to have a non-circular section perpendicular to the longitudinal axis A direction. For example, as shown in FIG. 11, the shaft member 31*a* may be formed to have a rectangular section perpendicular to the longitudinal axis A direction. When the shaft member 31*a* is formed to have a rectangular section, angles of the rectangular section do not have to be right angles and may be rounded to a practically suitable degree as shown. As shown in FIG. 12, the shaft member 31*a* may be formed to have an elliptical section perpendicular to the longitudinal axis A direction.

The shaft member 31*a* is formed to have a non-circular section perpendicular to the longitudinal axis A direction, and thus a couple of forces can be transmitted between a bush 50*a* and the shaft member 31*a*.

Figure 13:
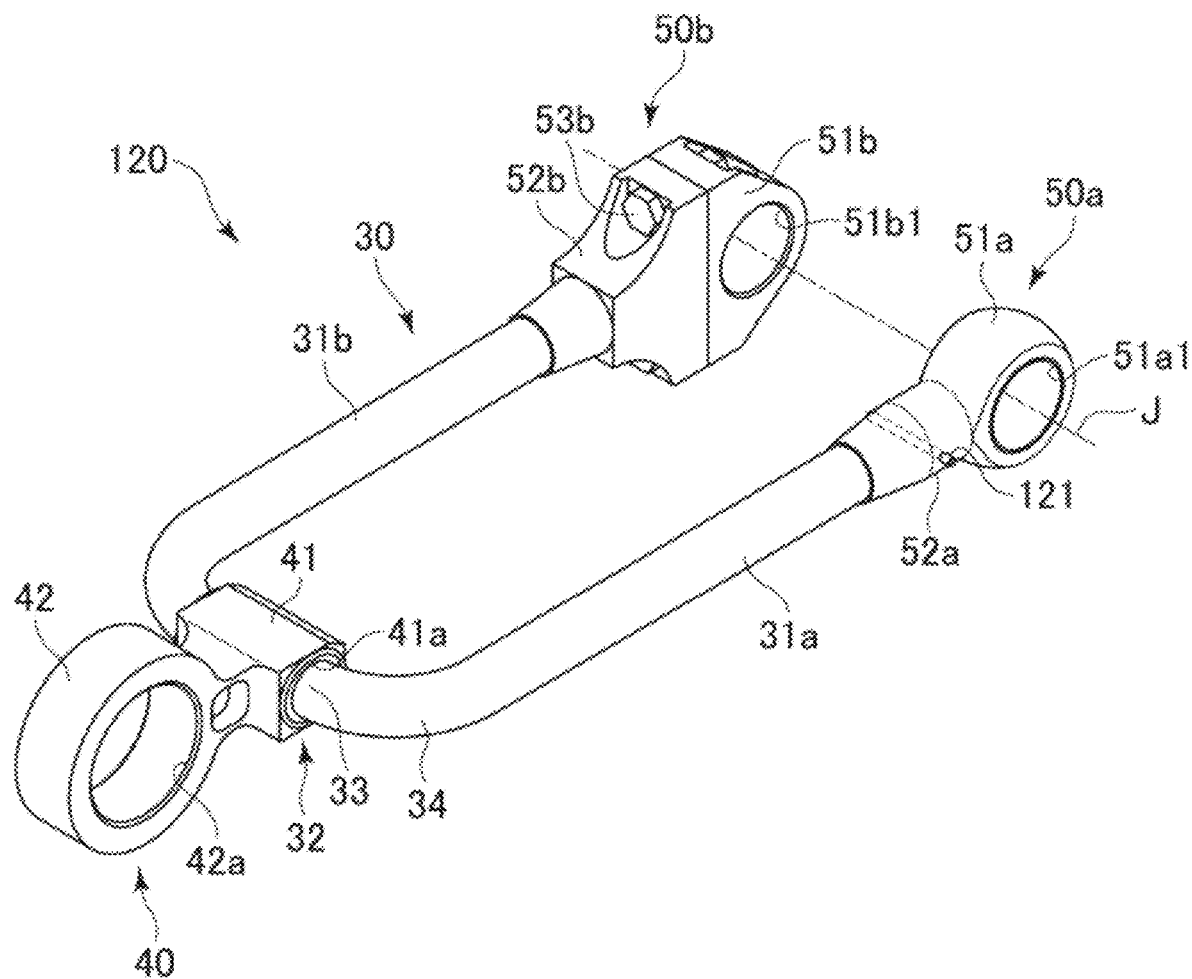
FIG. 13 is a perspective view of the aircraft reaction link according to another embodiment of the present invention.

Next, a reaction link according to another embodiment of the present invention will now be described with reference to FIG. 13. FIG. 13 is a perspective view of an aircraft reaction link 120 according to another embodiment of the present invention. The aircraft reaction link 120 is different from the aircraft reaction link 20 in that it includes a caulking pin 121. The caulking pin 121 is a member for further strengthen connection between the shaft member 31*a* and the bush 50*a*. Specifically, in this embodiment, the shaft member 31*a* has a small-diameter shaft member through hole, and the bush 50*a* has a bush through hole formed at a position therein facing the shaft member through hole. The shaft member through hole and the bush through hole may both be formed to pass through the longitudinal axis A and extend in a direction perpendicular to the longitudinal axis A. When the bush 50*a* is mounted to the shaft member 31*a*, the bush through hole and the shaft member through hole communicate with each other. A through hole formed by the bush through hole and the shaft member through hole communicating with each other is referred to as a pin through hole. The caulking pin 121 is inserted through the pin through hole. After being inserted through the pin through hole, the caulking pin 121 is plastically deformed so as to strengthen joining between the shaft member 31*a* and the bush 50*a*. The shaft member through hole formed in the shaft member 31*a* is formed so as not to cut reinforcement fibers contained in the shaft member 31*a*. For example, in a case where the reinforcement fibers contained in the shaft member 31*a* are formed by weaving together a plurality of filament bundles as shown in FIG. 8, the shaft member through hole is formed to have a diameter smaller than a pitch of the reinforcement fibers thus woven together. Thus, the caulking pin 121 can be inserted through the shaft member through hole without interfering with the reinforcement fibers. The caulking pin 121 may be formed in a columnar shape. The caulking pin 121 may have a small-diameter portion provided at part thereof in its axis direction. The small-diameter portion is formed to have a diameter smaller than that at any other part of the caulking pin 121. After having been plastically deformed to join the shaft member 31*a* to the bush 50*a*, the caulking pin 121 may be cut at the small-diameter portion.

In the foregoing embodiments, the present invention is applied to an aircraft reaction link and a moving surface driving device. The present invention, however, is not limited to the foregoing embodiments and also has other applications than an aircraft reaction link and a moving surface driving device. The present invention is broadly applied to a joining structure between a first member and a second member, the first member having a hole, the second member including a shaft member made of a fiber-reinforced composite material.

Next, a method for manufacturing the reaction link 20 according to one embodiment of the present invention will now be described with reference to FIG. 14 and FIG. 15A to FIG. 15F.

First, a bush is prepared at step ST1. The bush as mentioned here is, for example, the bush 50*a* or the bush 50*b* described in the foregoing embodiments.

Next, a core 81 is prepared at step ST2. As illustratively shown in FIG. 15A, the core 81 is formed in a U shape approximate to the shape of the link body 30. In the core 81, however, there is formed no bulge corresponding to the third portion 35*a*3. The core 81 includes a pair of legs 81*a* and 81*b* and a connection portion 81*c* connecting proximal ends of the pair of legs 81*a* and 81*b* to each other. An end of the leg 81*a* is closed, and an end of the leg 81*b* is open. The core 81 is formed so that the leg 81*b* as one of the legs 81*a* and 81*b* is longer than the other leg 81*a*. The leg 81*a* and the leg 81*b* are formed to have substantially the same diameter in respective sections at any positions in axis directions thereof. The core 81 is formed to be hollow. The hollow core 81 is, for example, a tube made of a synthetic resin. The synthetic resin used to form the core 81 is, for example, nylon, polyurethane, polytetrafluoroethylene, or any other known synthetic resin material.

Figure 15A:
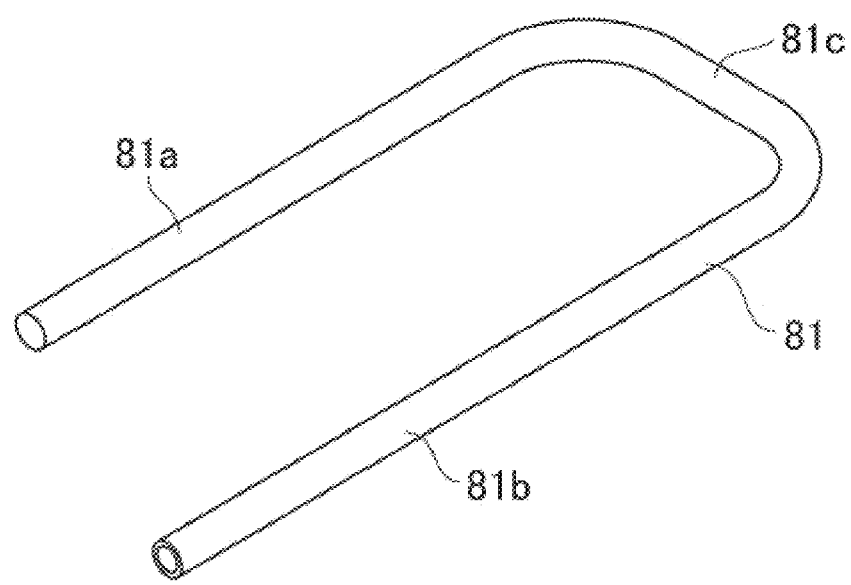
FIG. 15A to FIG. 15F are schematic views for showing the method for manufacturing the aircraft reaction link according to one embodiment of the present invention.
Figure 15B:
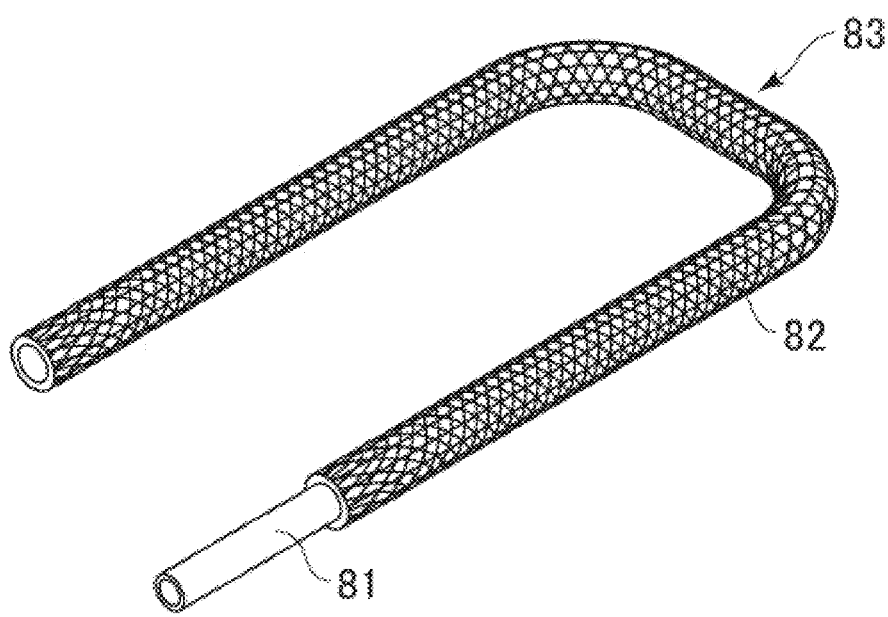
Figure 15C:
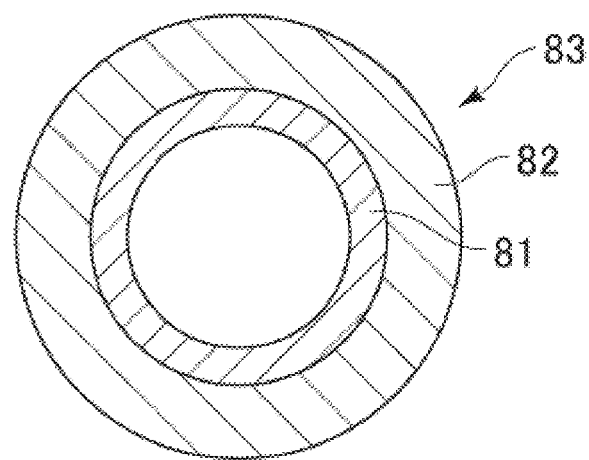

Next, at step ST3, a fiber-containing composite material layer 82 is formed on a surface of the core 81. Specifically, first, an impregnation fluid tank containing a matrix resin is prepared. As the matrix resin, a thermosetting resin such as unsaturated polyester, an epoxy resin, a polyamide resin, or a phenol resin, a thermoplastic resin such as methyl methacrylate, a UV-curable resin, a light-curable resin, or any other known matrix resin can be used. In this embodiment, it is assumed that unsaturated polyester is used as the matrix resin. A plurality of reinforcement fibers attached to a braiding machine are impregnated in the impregnation liquid tank. The plurality of reinforcement fibers may correspond to the reinforcement fibers 61, 62, and 63 described in the foregoing embodiments, respectively. Three reinforcement fibers impregnated with the matrix resin are woven into the core 81 by the braiding machine. Thus, a laminate 83 shown in FIG. 15B and FIG. 15C is formed. The laminate 83 includes the core 81 and the fiber-containing composite material layer 82 formed on the core 81. The fiber-containing composite material layer 82 is formed so as to entirely cover the leg 81*a* and the connection portion 81*c* and partly cover the leg 81*b*. The fiber-containing composite material layer 82 is not formed at a distal end of the leg 81*b*. The reinforcement fibers may be directly wound on the core 81 or indirectly wound thereon via a removal layer. For example, the removal layer is formed on an outer surface of the core 81 before the reinforcement fibers are wound on the core 81. The removal layer is made of, for example, a silicone resin. Providing the removal layer facilitates removal of the core 81. It is also possible to provide a removal layer on an outer surface of the laminate 83. Providing the removal layer on the outer surface of the laminate 83 can improve demoldability from an after-mentioned molding die. The fiber-containing composite material layer 82 can also be formed by using any known device suitable for weaving reinforcement fibers other than a braiding machine. Two or more fiber-containing composite material layers 82 may be formed.

Next, at step ST4, the bush 50a is mounted to one distal end of the laminate 83 obtained in the above-described manner. Specifically, the one distal end of the laminate 83 is inserted into the hole 55a formed in the bush 50a. The fitting 52b that is a constituent element of the bush 50b is mounted to the other end of the laminate 83. Specifically, the other distal end of the laminate 83 is inserted into the hole 55a formed in the fitting 52b. As described above, as shown in FIG. 15D, a composite laminate 84 is obtained by mounting the bush 50a and the fitting 52b to the laminate 83.

Figure 15D:
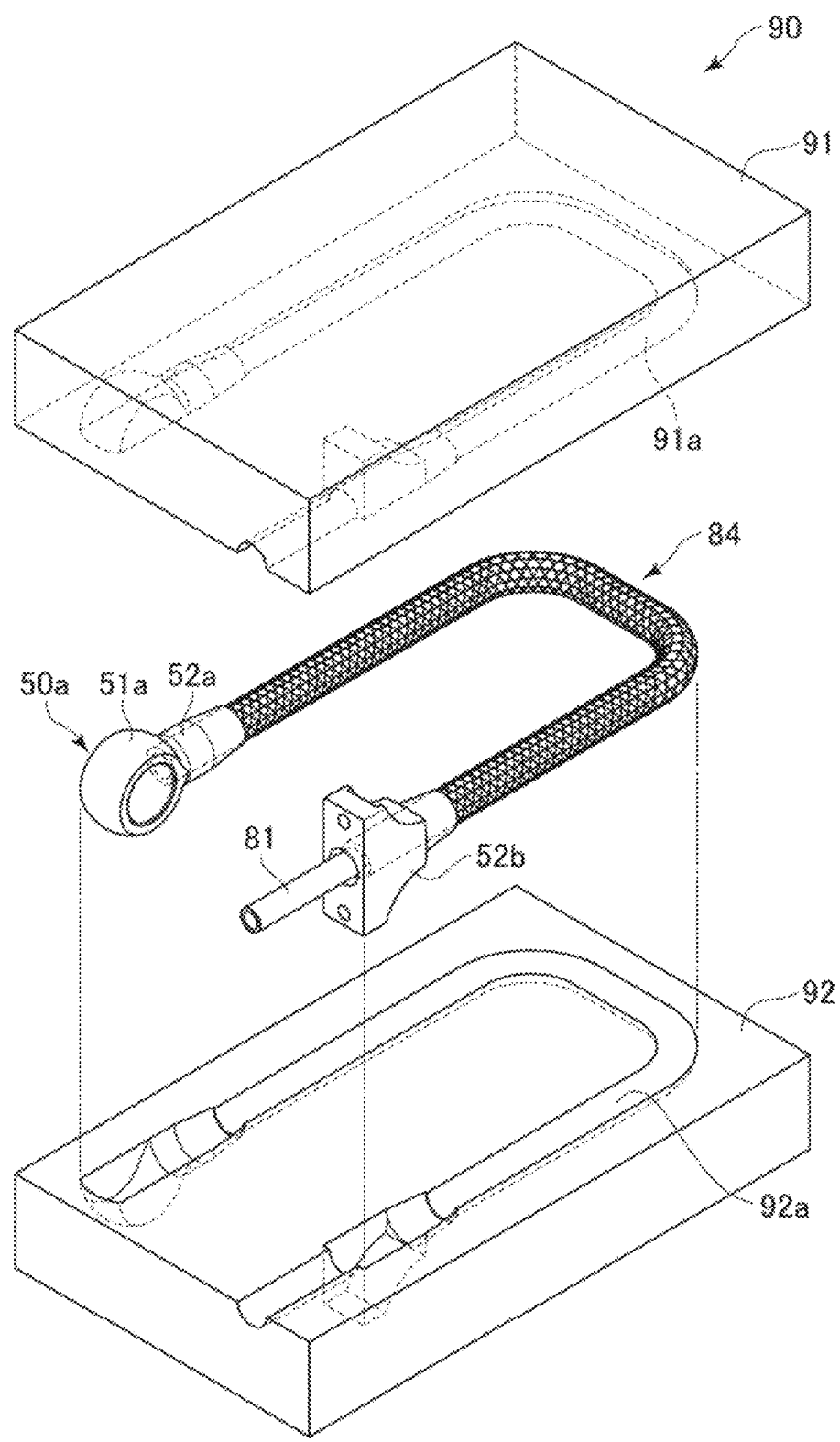
Figure 15E:
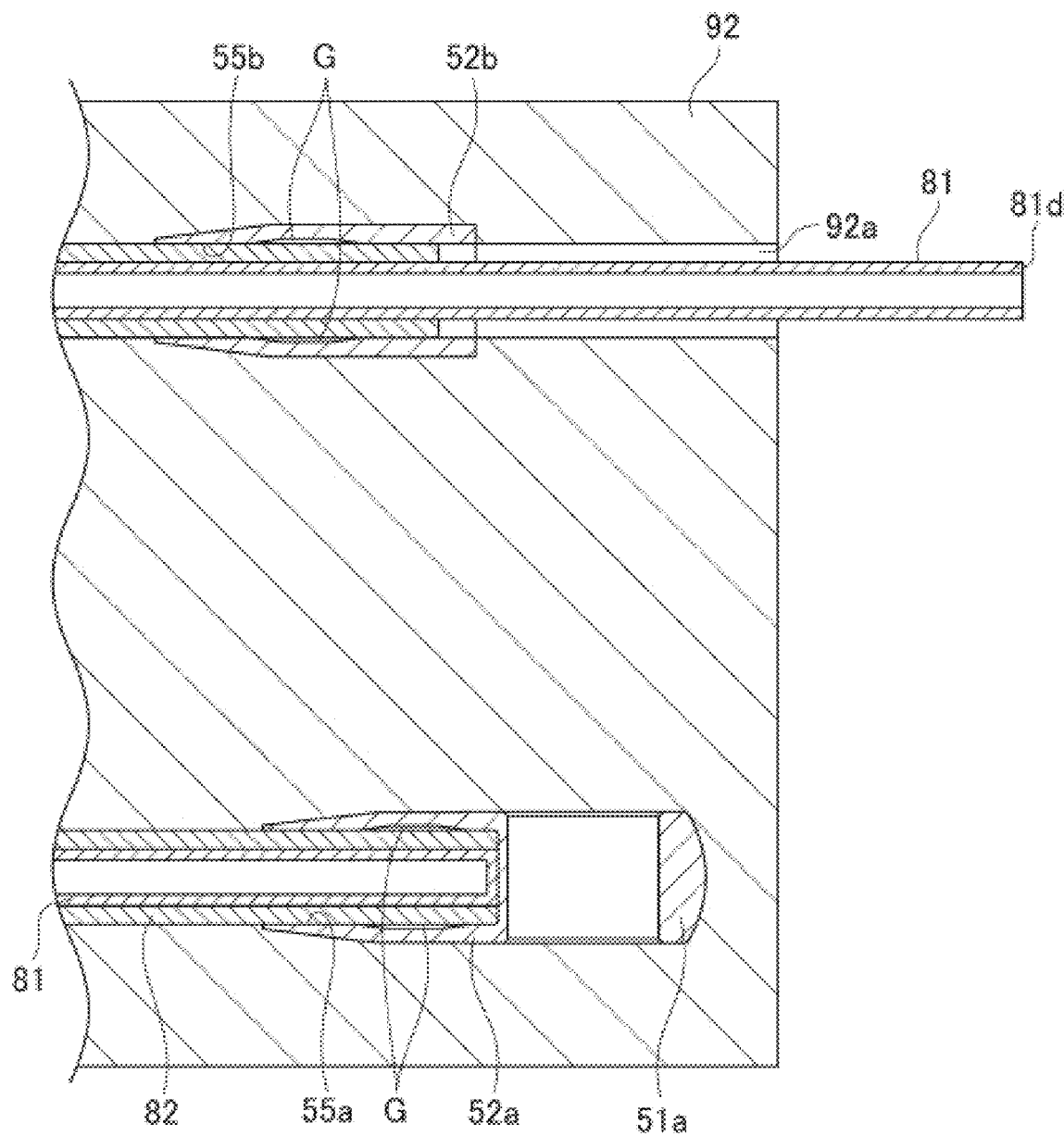
Figure 15F:
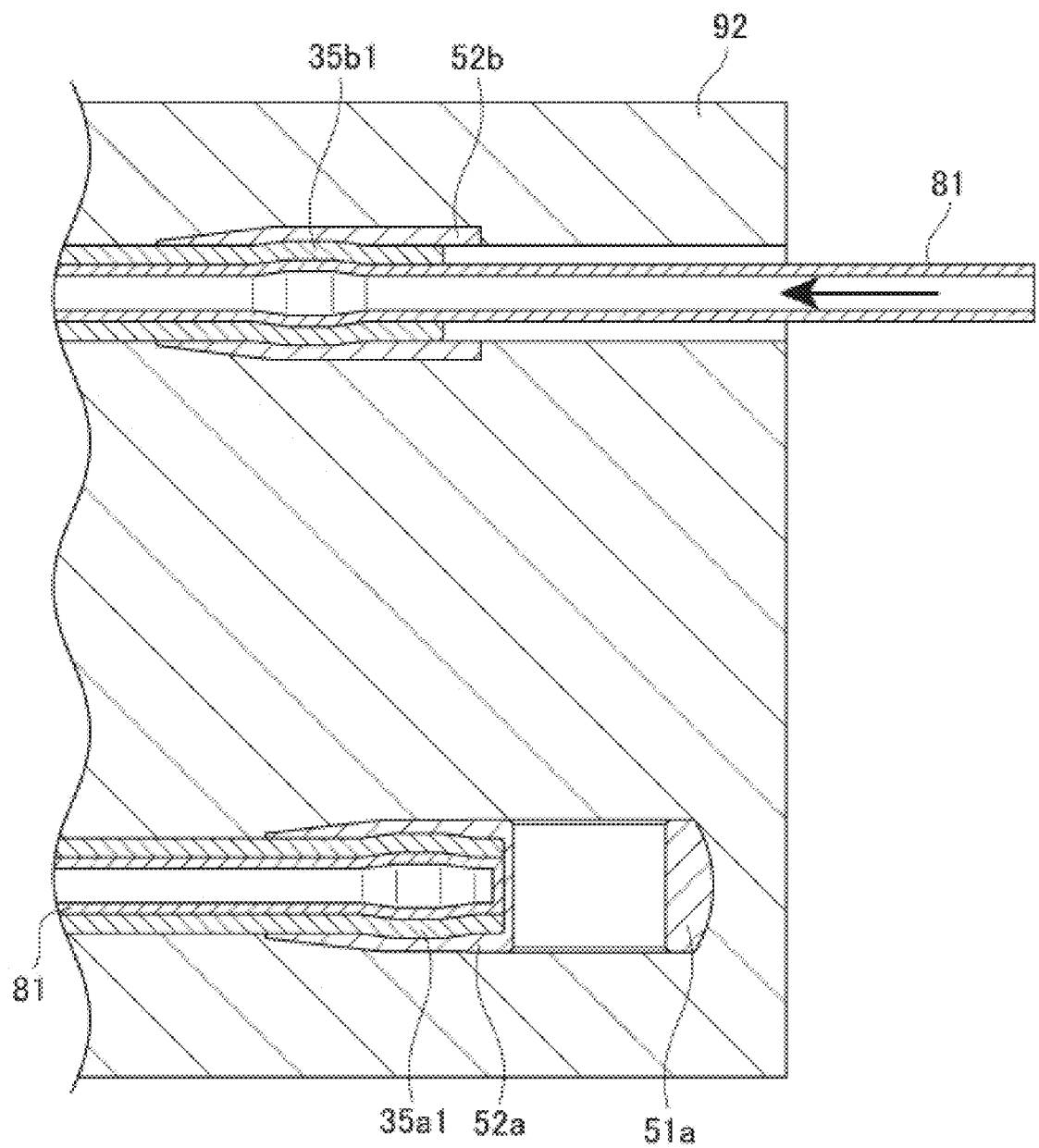

Next, at step ST5, the composite laminate 84 is disposed in a molding die 90. The molding die 90 includes an upper die 91 and a lower die 92 as shown in FIG. 15D. The upper die 91 has a cavity 91a having a shape conforming to the composite laminate 84. Similarly, the lower die 92 has a cavity 92a having a shape conforming to the composite laminate 84. There is a gap G between the composite laminate 84 disposed in the molding die 90 and the inner surface of the hole 55a of the bush 50a and between the composite laminate 84 disposed in the molding die 90 and the inner surface of the hole 55b of the fitting 52b. An unshown cap is attached to an opening end 81d of the hollow core 8a. The core 81 is connected to an unshown pump via the cap and a pipe.

Next, the molding die 90 is closed. The molding die 90 thus closed is placed in an unshown pressing machine. At step ST6, the molding die 90 placed in the pressing machine is heated, and compression air is fed from the pump into the hollow core 81. The end of the core 81 on an opposite side to the opening end 81d is closed, and thus in the core 81, an inner pressure is generated by the compression air fed from the pump. Due to the inner pressure, the core 81 expands outwardly in a width direction thereof. Furthermore, as the core 81 expands, the fiber-containing composite material layer 82 also expands outwardly in the width direction to such an extent that the gap G between the fiber-containing composite material layer 82 and each of the hole 55a and the hole 55b disappears. Thus, the fiber-containing composite material layer 82 tightly adheres to the inner surface of the hole 55a and the inner surface of the hole 55b. The fiber-containing composite material layer 82 is cured in a state of tightly adhering to the inner surface of the hole 55a and the inner surface of the hole 55b.

Next, at step ST7, the composite laminate 84 thus cured is demolded from the molding die 90, and the core 81 is removed from the composite laminate 84. A portion of the core 81 exposed from the fitting 52b is grasped and pulled out, and thus the core 81 is removed from the composite laminate 84. Thus, there is obtained the link body 30 with the bush 50a and the fitting 52b mounted to distal ends thereof. By removing the core 81, it is possible to achieve a weight reduction of an aircraft reaction link as a completed product.

Finally, at step ST8, the bush body 51b is mounted to the fitting 52b, and thus the bush 50b is obtained. The bush body 51b is fastened to the fitting 52b by using, for example, the fastening member 53b. Furthermore, the head 40 is mounted to the link body 30.

By following the above-described process steps, there is obtained an aircraft reaction link in which a link body is joined to a bush without a decrease in strength of the link body.

Figure 14:
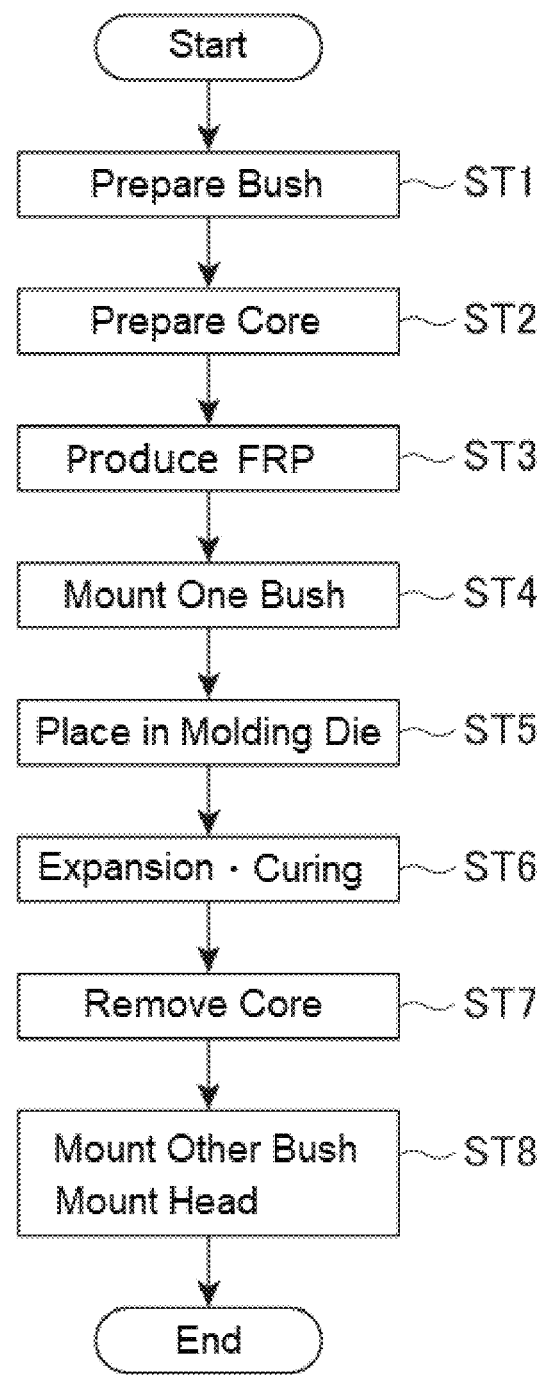
FIG. 14 is a flow chart showing a method for manufacturing the aircraft reaction link according to one embodiment of the present invention.

The flow chart shown in FIG. 14 is one example of the method for manufacturing an aircraft reaction link to which the present invention is applied, and the present invention is not limited to the specific flow shown in FIG. 14.

Some of the process steps of the flow shown in FIG. 14 may be omitted within the purport of the present invention. For example, step ST7 of removing the core 81 may be omitted.

Process steps not shown in FIG. 14 may be executed as required. The process steps not shown in FIG. 14 may be executed additionally to the process steps shown in FIG. 14 or alternatively to some of the process steps shown in FIG. 14. For example, a process of polishing a surface of the laminate 83 formed at step ST3 may be performed.

The process steps shown in FIG. 14 may be executed in different orders as required within the purport of the present invention. For example, step ST1 of preparing the bush may be performed after step ST2 of preparing the core 81. The process step of mounting the head 40 to the link body 30 may be performed after step ST4 and before step ST5.

Some of the process steps shown in FIG. 14 may be performed concurrently or in parallel, if possible. For example, step ST1 of preparing the bush and step ST2 of preparing the core 81 may be performed in parallel. The process steps other than these may also be performed at the same time or in parallel.

The core 81 may be formed to be solid from a thermally expandable resin composition. The thermally expandable resin composition used for the solid core 81 is a resin composition including a binder resin containing thermally expandable graphite.

In the foregoing embodiment, the present invention is applied to a method for manufacturing an aircraft reaction link. The present invention is, therefore, not limited to the foregoing embodiment. The present invention is applicable also to a method for manufacturing an article other than an aircraft reaction link. As is clear from the disclosure herein, the present invention is broadly applied to a method for joining a first member to a second member, the first member having a hole extending along an axis direction, the second member including a shaft member made of a fiber-containing composite material.

The dimensions, materials, arrangements, and process steps of the various constituent elements described herein are not limited to those explicitly described in the embodiments, and the various constituent elements can be modified to have any dimensions, materials, arrangements, and process steps within the scope of the present invention. Furthermore, constituent elements not explicitly described herein can also be added to the embodiments described, and it is also possible to omit some of the constituent elements described in the embodiments.

What is claimed is:

1. A joining method for joining a first bush and a second bush to an elongated link body, the elongated link body being made of a fiber-containing composite material, the method comprising the steps of:
   (A) preparing the first bush and the second bush;
   (B) preparing a core having a first leg, a second leg and a connecting portion connecting a proximal end of the first leg and a proximal end of the second leg, the second leg being longer than the first leg;
(C) obtaining a laminate by forming a fiber-containing composite material layer on the core such that an outer surface of a distal end of the second leg is not covered by the fiber-containing composite material layer;
(D1) inserting a distal end of the first leg covered by the fiber-containing composite material layer into a first hole of the first bush;
(D2) inserting at least part of the second leg covered by the fiber-containing composite material layer into a second hole of the second bush such that the distal end of the second leg protrudes from the second hole;
(E) causing expansion of the core; and
(F) obtaining the elongated link body in a shape to fit in the first hole of the first bush and in the second hole of the second bush by curing the fiber-containing composite material layer.

2. The joining method according to claim 1,
wherein the fiber-containing composite material layer contains reinforcement fibers; and
wherein the elongated link body is joined to the first bush and the second bush to form a joining structure, without the reinforcement fibers being cut.

3. The joining method according to claim 1, further comprising the step of:
removing the core,
wherein the step of removing the core is configured to achieve a weight reduction of the joining structure.

4. The joining method according to claim 1, wherein the core is formed to be solid formed from a thermally expandable resin composition.

5. The joining method according to claim 4, wherein the thermally expandable resin composition is a resin composition including a binder resin containing thermally expandable graphite.

6. The joining method according to claim 1, wherein the core is formed to be hollow.

7. The joining method according to claim 6, wherein the hollow core is a tube made of synthetic resin.

8. The joining method according to claim 7, wherein the synthetic resin includes nylon material, polyurethane material, or polytetrafluoroethylene material.

9. The joining method according to claim 1, wherein, at the step (C), a removal layer is provided on an outer surface of the core,
wherein the fiber-containing composite material layer is formed on the removal layer,
wherein the removal layer is made of a silicone resin, and
wherein the removal layer is provided to facilitate removal of the core.

10. The joining method according to claim 1, wherein the step (A) of preparing the first member is performed after the step (B) of preparing the core.

11. The joining method according to claim 1, wherein the step (A) of preparing the first member and the step (B) of preparing the core are performed in parallel.

12. The joining method according to claim 1, wherein, at step (E), due to an inner pressure that is generated by compression air fed into the core, the core expands outwardly in a width direction thereof, and
wherein, as the core expands, the fiber-containing composite material layer also expands outwardly in the width direction so that the fiber-containing composite material layer tightly adheres to an inner surface of the first hole of the first bush and to an inner surface of the second hole of the second bush.

13. The joining method according to claim 1, wherein, at step (F), the fiber-containing composite material layer is cured in a state in which the fiber-containing composite material layer tightly adheres to an inner surface of the first hole of the first bush and to an inner surface of the second hole of the second bush.

14. The joining method according to claim 3, wherein the step of removing the core includes:
grasping the distal end of the core exposed from the second bush; and
pulling the core out of the laminate.

15. The joining method according to claim 3, wherein the distal end of the first leg is closed and the distal end of the second leg is open.

* * * * *